(12) United States Patent
Matsuda

(10) Patent No.: US 8,119,296 B2
(45) Date of Patent: Feb. 21, 2012

(54) ELECTRONIC EQUIPMENT HAVING FUEL CELL WITH GASEOUS WATER DISCHARGING SECTION

(75) Inventor: Takashi Matsuda, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 1230 days.

(21) Appl. No.: 11/890,707

(22) Filed: Aug. 7, 2007

(65) Prior Publication Data

US 2008/0038605 A1 Feb. 14, 2008

(30) Foreign Application Priority Data

Aug. 8, 2006 (JP) ................................. 2006-215923

(51) Int. Cl.
 *H01M 8/06* (2006.01)
(52) U.S. Cl. ......................... 429/414; 429/408; 429/413
(58) Field of Classification Search .................. 429/408, 429/413, 414
See application file for complete search history.

(56) References Cited

U.S. PATENT DOCUMENTS

| | | | | |
|---|---|---|---|---|
| 2005/0082033 | A1* | 4/2005 | Huang et al. .................. | 165/80.3 |
| 2006/0068240 | A1* | 3/2006 | Matoba ............................ | 429/12 |
| 2006/0240299 | A1* | 10/2006 | Kanasugi ........................ | 429/24 |

FOREIGN PATENT DOCUMENTS

| | | | |
|---|---|---|---|
| JP | 2002-313405 A | | 10/2002 |
| JP | 2002313405 A | * | 10/2002 |
| JP | 2004-119027 A | | 4/2004 |

OTHER PUBLICATIONS

Japanese Office Action (and English translation thereof) dated Jun. 24, 2008, issued in a counterpart Japanese Application.

* cited by examiner

*Primary Examiner* — Barbara Gilliam
*Assistant Examiner* — Zachary Best
(74) *Attorney, Agent, or Firm* — Holtz, Holtz, Goodman & Chick, PC

(57) ABSTRACT

Disclosed is an electronic equipment including: a power source section including a fuel cell; and an electronic equipment main body driven by the electric power, wherein the power source section includes: a generation section including the fuel cell to perform power generation by the fuel cell and to discharge a discharging gas containing gaseous water; a discharging section to discharge a gas containing the gaseous water; and a control section to control a quantity of the gaseous water in the gas to be discharged from the discharging section on the basis of at least one of an ambient environmental condition of the electronic equipment and a usage state of the electronic equipment. Thereby, it can be prevented that the housing of the electronic equipment, the things around the electronic equipment, and a user of the electronic equipment are moistened by the water discharged from the discharging section.

20 Claims, 20 Drawing Sheets

ELECTRONIC EQUIPMENT HAVING FUEL CELL WITH GASEOUS WATER DISCHARGING SECTION

CROSS-REFERENCE TO RELATED APPLICATIONS

This application is based upon and claims the benefit of priority of prior Japanese Patent Application No. 2006-215923, filed Aug. 8, 2006; the entire contents of which are incorporated herein by reference.

BACKGROUND OF THE INVENTION

1. Field of the Invention

The present invention relates to an electronic equipment, and more particularly to an electronic equipment mounting a fuel cell thereon to be driven by electric power generated by the mounted fuel cell.

2. Description of Related Art

In recent years, portable electronic equipments, such as a portable telephone, a notebook computer, a digital camera, a wrist watch, a personal digital assistance (PDA), and an electronic notebook, have remarkably advanced, and have been developed.

An electronic equipment equipped with a generation section using a fuel cell as the power source section of the electronic equipment was proposed in response to the increase of the power consumption of the electronic equipments like this. In the fuel cell, a fuel for power generation, such as methanol, is needed for performing power generation to take out electric power.

Moreover, when the fuel cell performs power generation, water is simultaneously produced. The water produced by the fuel cell is discharged from the fuel cell as a gas. A configuration of withdrawing the gaseous water in the state of the water as a liquid to reserve the withdrawn water in, for example, a power source section including the fuel cell or in a withdrawing container provided in the electronic equipment was proposed. If the configuration of reserving the withdrawn water in the withdrawing container is adopted, the power generation cannot be continued when the withdrawing container is filled to the capacity. Consequently, when the withdrawing container is filled to the capacity, the water in the withdrawing container must be discharged. For the sake of this, a configuration to suitably cast away the water in the withdrawing container or a configuration of vaporizing the water in the withdrawing container to discharge the vaporized water to the open air has been proposed.

If the water in the withdrawing container is vaporized, the trouble of casting away the water in the withdrawing container can be saved. But, when the ambient humidity is relatively high, the vaporized water condenses, and the housing of the electronic equipment and the things around the electronic equipment are sometimes moistened by the condensation. Moreover, a portable electronic equipment is frequently operated with a human hand. In this case, a hand of a user of the electronic equipment is sometimes moistened when the withdrawn water is vaporized to be discharged.

SUMMARY OF THE INVENTION

The present invention has an advantage of preventing an electronic equipment using a fuels cell, a thing around the electronic equipment, and a user of the electronic equipment from being moistened by the discharge of a gaseous water produced by the fuel cell in the electronic equipment having a power source section equipped with the fuel cell driving the electronic equipment.

To obtain above advantage, the first electronic equipment according to the invention is An electronic equipment including: a power source section including a fuel cell to output electric power generated by the fuel cell; and an electronic equipment main body driven by the electric power output from the power source section, wherein the power source section includes: a generation section including the fuel cell to perform power generation by the fuel cell and to discharge a discharging gas containing gaseous water produced by the fuel cell; a discharging section to discharge to the outside a gas containing the gaseous water contained in the discharging gas discharged by the generation section; and a control section to control a quantity of the gaseous water in the gas to be discharged from the discharging section to the outside on the basis of at least one of an ambient environmental condition of the electronic equipment and a usage state of the electronic equipment.

To obtain above advantage, the second electronic equipment according to the invention is an electronic equipment including: a power source section including a fuel cell to output electric power generated by the fuel cell; and an electronic equipment main body driven by the electric power output from the power source section, wherein the power source section includes: a generation section including the fuel cell to perform power generation by the fuel cell and to discharge discharging gas containing gaseous water produced in the fuel cell; a discharging section to discharge to the outside a gas containing the gaseous water contained in the discharging gas discharged from the generation section; a humidity detection section to detect humidity in the neighborhood of an external surface of the electronic equipment; and a control section to control, if the detected humidity exceeds the predetermined threshold value, a quantity of the gaseous water in the gas discharged from the discharging section to the outside to be reduced in comparison with a quantity of the gaseous water at the time when the humidity detected by the humidity detection section does not exceed a predetermined threshold value.

To obtain above advantage, the third electronic equipment according to the invention is an electronic equipment including: a power source section including a fuel cell to output electric power generated by the fuel cell; and an electronic equipment main body driven by the electric power output from the power source section, wherein the power source section includes: a generation section including the fuel cell to perform power generation by the fuel cell and to discharge discharging gas containing gaseous water produced in the fuel cell; a discharging section to discharge to the outside a gas containing the gaseous water contained in the discharging gas discharged from the generation section; a touch detection section to detect a touch of a human body to the electronic equipment; and a control section to control, if the touch is detected by the touch detection section, a quantity of the gaseous water in the gas discharged from the discharging section to the outside to be reduced in comparison with a quantity of the gaseous water at the time when the touch of the human body to the electronic equipment does not detected by the touch detection section.

BRIEF DESCRIPTION OF THE DRAWINGS

The present invention will become more fully understood from the following detailed description and the appended drawings, and thus are not intended as a definition of the limits of the invention, and wherein.

DETAILED DESCRIPTION OF THE PREFERRED EMBODIMENTS

In the following, the details of an electronic equipment according to the present invention will be described on the basis of the embodiments shown in the attached drawings. Although various limitations that are technically preferable for implementing the present invention are given to the embodiments described in the following, the limitations do not intended to limit the scope of the invention to the following embodiments and shown examples.

Electronic equipments to which the present invention is applied are portable electronic equipments, such as a portable telephone, a notebook computer, a digital camera, a wrist watch, a personal digital assistance (PDA), and an electronic notebook, and each of the electronic equipments is provided with a power source section 100 having a fuel cell. The configuration of the power source section 100 equipped with the fuel cell in the present invention is first described.

Figure 1:
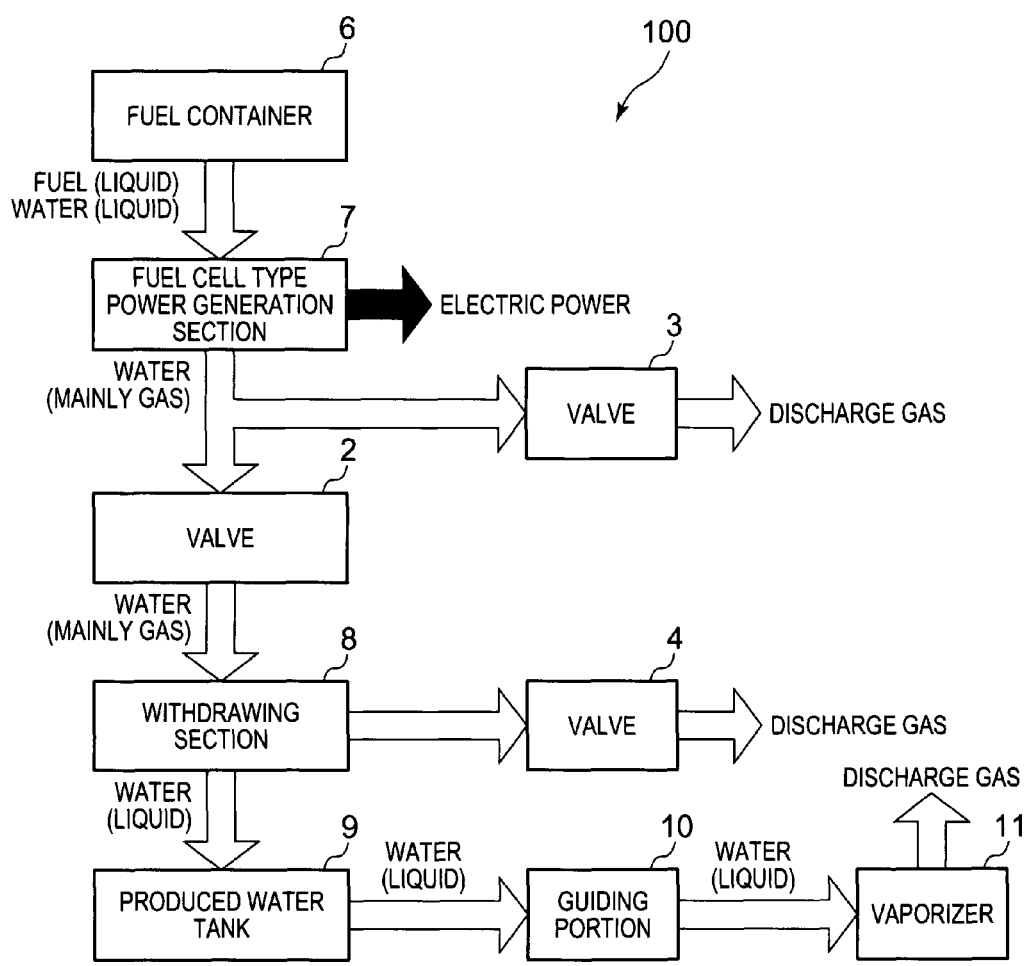
FIG. 1 is a block diagram showing the configuration of a power source section in the present invention.

FIG. 1 is a block diagram showing the configuration of the power source section 100 in the present invention.

As shown in FIG. 1, the power source section 100 includes a fuel container 6, a fuel cell type power generation section (generation section) 7, a withdrawing section 8, a produced water tank (reserving section) 9, a guiding section 10, a vaporizer 11, and valves 2-4.

The fuel container 6 reserves a liquid fuel (such as methanol, ethanol, or dimethyl ether) as a fuel for power generation and water separately or in a mixed state. The fuel container 6 is, for example, detachably attachable to the main body of an electronic equipment, and the fuel container 6 is exchangeable when the fuel and the water in the fuel container 6 have been discharged.

The fuel cell type power generation section 7 is composed of, for example, a vaporizer, a reformer, a carbon monoxide remover, a generation cell, a liquid pump, a gas pump, a flow rate sensor, a heater, a catalyst combustor, valves, and the like.

The air on the outside of the electronic equipment is sent to the carbon monoxide remover and the generation cell by the gas pump, and the fuel and the water in the fuel container 6 are sent to the vaporizer by the liquid pump. The fuel and the water are heated to be vaporized by the vaporizer, and the vaporized fuel and water are supplied to the reformer. A reformed gas (including hydrogen, carbon dioxide, carbon monoxide, and the like) is produced from the mixture gas of the fuel and the water by the reformer, and the carbon monoxide in the reformed gas is removed by oxidization in the carbon monoxide remover. The reformed gas from which the carbon monoxide has been removed is then supplied to the generation cell. In the generation cell, an electrochemical reaction between the hydrogen in the reformed gas and the oxygen in the air occurs. Thereby, electric power is extracted, and gaseous water (steam) is produced. The steam and a gas (discharge gas) containing nitrogen, oxygen, carbon dioxide, and the like, are discharged. Now, the generation cell has an oxygen electrode (cathode) and a fuel electrode (anode). The air is supplied to the oxygen electrode, and the reformed gas is supplied to the fuel electrode. Electric power is extracted by the electrochemical reaction, and an offgas containing unreacted residual hydrogen, which has not been used for the electrochemical reaction in the generation cell, in the reformed gas is discharged from the fuel electrode. The offgas is supplied to the catalyst combustor, and the hydrogen in the offgas is consumed by the burning reaction in the catalyst combustor. Thus a gas from which the hydrogen has been removed is discharged. Moreover, a gas containing gaseous moisture produced by the electrochemical reaction is discharged also from the oxygen electrode. These gases discharged from the catalyst combustor and the oxygen electrode (cathode) in the generation cell constitute the aforesaid discharge gas.

Moreover, the fuel cell type power generation section 7 may be composed of a vaporizer, a fuel cell, and the like. In this case, the fuel in the fuel container 6 is sent to the vaporizer, and the fuel and water are mixed to be vaporized in the vaporizer. Furthermore, an electrochemical reaction of the fuel, the water, and the oxygen in the air is caused in the fuel cell. Electric power is thereby extracted, and a discharge gas exhaust containing gaseous water (steam) is discharged.

The discharge gas containing the steam produced in the fuel cell type power generation section 7 is discharged to the outside of the electronic equipment through the valve (first discharging section) 3, or is sent to the withdrawing section 8 through the valve 2.

The withdrawing section 8, for example, includes a heat exchanger and a cooling unit cooling the steam in the discharge gas to change at least a part of the steam into water in the form of a liquid for withdrawing the water. The water that has been cooled and liquefied by the cooling unit is sent from the withdrawing section 8 to the produced water tank 9.

Moreover, the withdrawing section 8 has the configuration of discharging the gas obtained by removing the steam withdrawn by the heat exchanger and the like from the supplied discharge gas through the valve (second discharging section) 4 to the outside of the electronic equipment.

The water sent to the produced water tank 9 is reserved in the produced water tank 9. The water reserved in the produced water tank 9 is sent to the vaporizer 11 through the guiding section 10, and is vaporized in the vaporizer 11 to transpire to the outside.

The valves 2-4 opens to allow a fluid to flow, and closes to obstruct the flow of the fluid. The valves 2-4 are controlled by a fuel cell control section 20, which will be described later. The destination of the water (steam) produced by the fuel cell type power generation section 7 is determined according to the opening and the closing of the valves 2-4. That is, if the valves 2 and 4 close when the valve 3 opens, then the destination of the steam produced by the fuel cell type power generation section 7 is switched to the outside of the electronic equipment. If the valves 2 and 4 open when the valve 3 closes, then the destination of the steam produced by the fuel cell type power generation section 7 is switched to the produced water tank 9.

Moreover, there is also the case where the gaseous water in the discharged gas condenses to be liquid water in the path from the fuel cell type power generation section 7 to the withdrawing section 8 at some temperature or the like of the device or the ambiance thereof. The water produced in this manner like this is carried away to the withdrawing section 8 along the flow of the discharge gas, and is reserved in the produced water tank 9.

Figure 2:
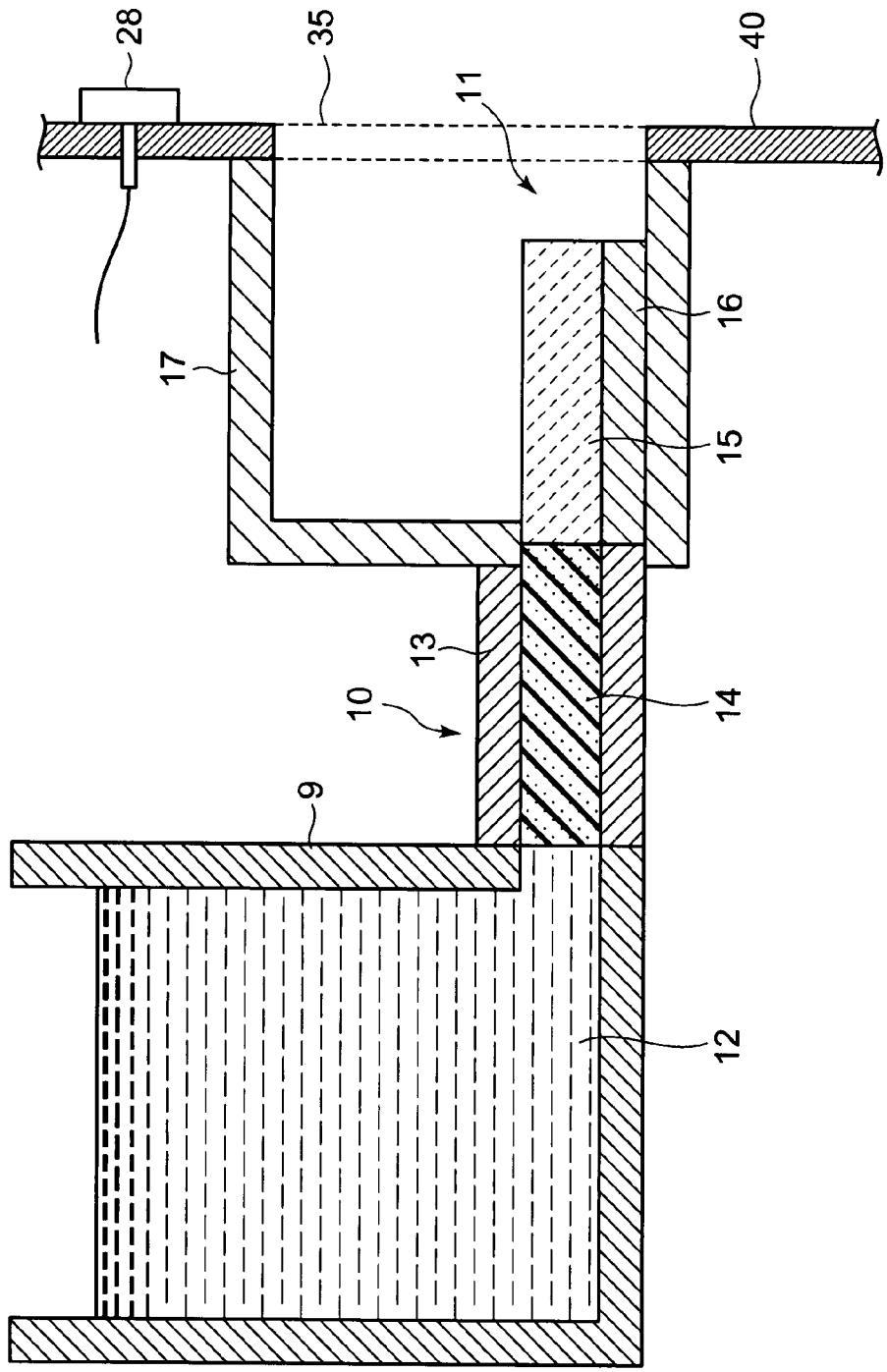
FIG. 2 is a sectional view showing a first example of a produced water tank, a guiding section, and a vaporizer in the power source section.

FIG. 2 is a sectional view showing a first example of the produced water tank, the guiding section, and the vaporizer 11 in the power source section.

In the first example of the guiding section and the vaporizer, as shown in FIG. 2, a hole 12 is formed at the lower part of the produced water tank 9; the guiding section 10 is connected to the hole 12; and the vaporizer 11 is connected to the guiding section 10.

The guiding section 10 is composed of a pipe 13 and a fiber material 14. The pipe 13 is connected to the hole 12 of the produced water tank 9, and the fiber material 14 is filled in the pipe 13.

The vaporizer 11 is composed of a ceramic porous material 15 and a heater 16. One end of the vaporizer 11 is connected to the guiding section 10 with a part of the end blocked, and the other end is enclosed by a discharge pipe 17 connected to an opening (discharge opening) 35 opened on the wall surface of the housing 40 of the electronic equipment. When electric power is supplied to the heater 16 and the ceramic porous material 15 is heated, the vaporizer 11 operates. When the supply of the electric power to the heater 16 stops, the vaporizer 11 stops. The heater 16 is, for example, a plane type heater, and the ceramic porous material 15 is mounted on the heater 16. The water in the produced water tank 9 is absorbed by the fiber material 14, and permeates the ceramic porous material 15. When the ceramic porous material 15 is heated by the heater 16, the water in the ceramic porous material 15 is vaporized, and the vaporized water transpires from the ceramic porous material 15. The transpired water is discharged from the discharge pipe 17 to the outside of the electronic equipment through the opening 35.

Figure 3:
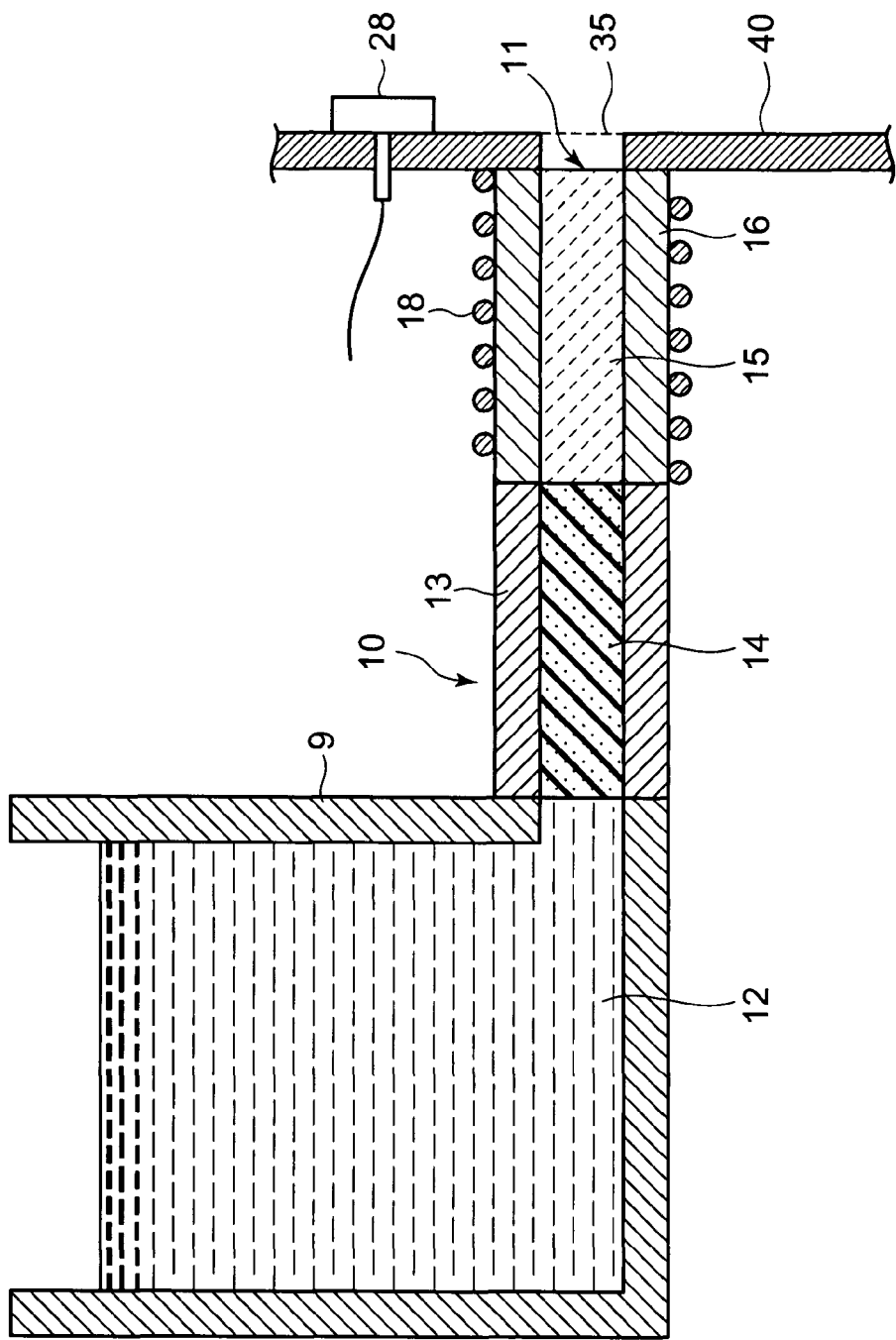
FIG. 3 is a sectional view showing a second example of the produced water tank, the guiding section and the vaporizer in the power source section.

FIG. 3 is a sectional view showing a second example of the produced water tank, the guiding section, and the vaporizer in the power source section.

In FIG. 3, the same components as those of FIG. 2 are denoted by the same reference characters, and their descriptions are simplified. In the second example, as shown in FIG. 3, the vaporizer 11 is composed of the ceramic porous material 15, the heater 16, and a metal pipe 18. One end of the metal pipe 18 is connected to the pipe 13 of the guiding section 10, and the other end of the metal pipe 18 is connected to the opening (discharge opening) 35 opened on the wall surface of the housing 40 of the electronic equipment. The ceramic porous material 15 is filled in the metal pipe 18, and the ceramic porous material 15 touches the fiber material 14. The heater 16, which is a heating wire, is wound around the metal pipe 18. The water in the produced water tank 9 is absorbed by the fiber material 14, and permeates the ceramic porous material 15. When the ceramic porous material 15 is heated by the heater 16, the water in the ceramic porous material 15 is vaporized, and the vaporized water transpires from the ceramic porous material 15. The transpired water is discharged from the metal pipe 18 to the outside of the electronic equipment through the opening 35.

Incidentally, the discharging through the second valve 3, the discharging through the third valve 4, and the discharging through the vaporizer 11 may be performed through the same discharge opening, or may be performed through different respective discharge openings.

Moreover, a humidity sensor 28 is provided in the neighborhood of the openings of the discharge pipe 17 and the metal pipe 18 as shown in FIGS. 2 and 3, for example. Incidentally, if the discharging through the second valve 3, the discharging through the third valve 4, and the discharging through the vaporizer 11 are performed through different discharge openings, the humidity sensor 28 may be provided in the neighborhood of each discharge opening or any one of the discharge openings.

First Embodiment

Next, the embodiments of an electronic equipment 1 provided with the power source section 100 mentioned above will be described.

Figure 4:
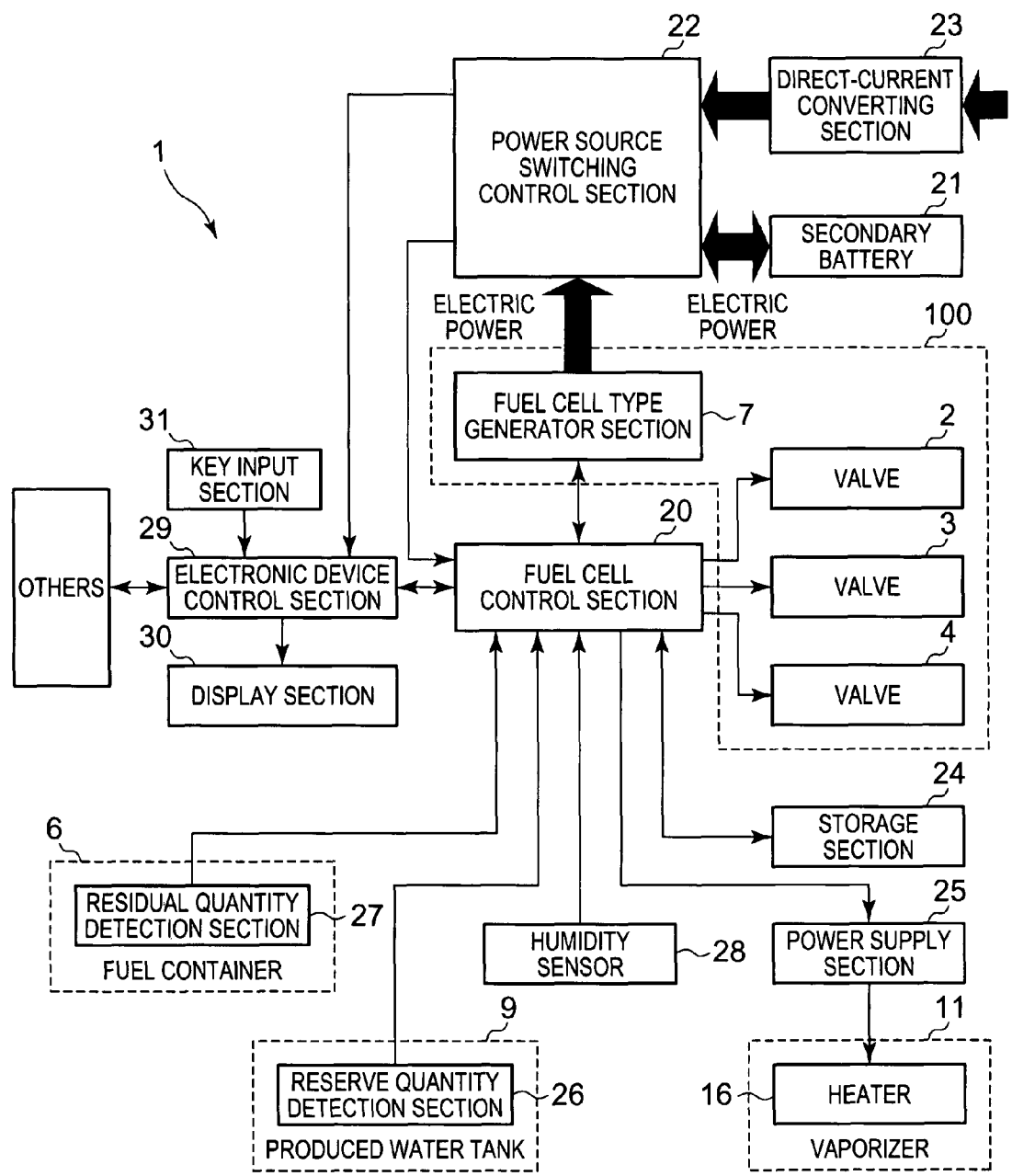
FIG. 4 is a block diagram showing a first embodiment of a circuit configuration of an electronic equipment in the present invention.

FIG. 4 is a block diagram showing a first embodiment of the circuit configuration of the electronic equipment of the present invention.

As shown in FIG. 4, the electronic equipment 1 is provided with the fuel cell control section 20, a secondary battery 21, a power source switching control section 22, a direct-current converting section 23, a storage section 24, a power supply section 25, the humidity sensor 28, an electronic equipment control section 29, a display section 30, a key input section 31, and the like. Moreover, the fuel container 6 is provided with a residual quantity detection section 27, and the produced water tank 9 is provided with a reserve quantity detection section 26.

The secondary battery (power holding section) 21 stores electric energy in the form of chemical energy.

The direct-current converting section 23 is an AC-DC converter to convert an alternating voltage of a commercial power source into a direct-current voltage when the commercial power source is connected to the electronic equipment 1 from the outside. The electric power converted into the direct current by the direct-current converting section 23 and the electric power generated by the fuel cell type power generation section 7 are output to the power source switching control section 22.

The power source switching control section 22 stores at least part of the electric power input from the direct-current converting section 23 and the electric power input from the fuel cell type power generation section 7 into the secondary battery 21. Moreover, the power source switching control section 22 supplies the electric power input from the direct-current converting section 23 to each section of the electronic equipment 1, for example, when the commercial power source is connected to the electronic equipment 1 and the electric power is input from the direct-current converting section 23. The power source switching control section 22 supplies the electric power input from the fuel cell type power generation section 7 to each section of the electronic equipment 1 when no electric power is input from the direct-current converting section 23. Moreover, the power source switching control section 22 supplies the electric power of the secondary battery 21 to each section of the electronic equipment 1, for example, when no electric power is input from the direct-current converting section 23 and the fuel cell type power generation section 7 is in its start-up, or when the drive load of the electronic equipment 1 is too large and the electric power input from the fuel cell type power generation section 7 is consequently insufficient. Moreover, the power source switching control section 22 outputs a signal indicating which electric power is used among the electric power from the direct-current converting section 23, from the fuel cell type power generation section 7, and from the secondary battery 21, and a signal indicating the stored electricity quantity of the secondary battery 21 to the fuel cell control section 20 and the electronic equipment control section 29.

The humidity sensor 28 is a humidity detection section, and is, for example, a ceramic humidity sensor. The humidity sensor 28 detects the humidity in the neighborhood of the external surface of the electronic equipment 1 as the ambient environmental condition of the electronic equipment 1, and outputs a humidity signal indicating the humidity to the fuel cell control section 20.

The residual quantity detection section 27 detects the residual quantities of the fuel and the water in the fuel container 6, and outputs a residual quantity signal indicating the residual quantity to the fuel cell control section 20.

The reserve quantity detection section 26 detects the reserve quantity of the water in the produced water tank 9, and outputs a reserve quantity signal indicating the reserve quantity to the fuel cell control section 20. The residual quantity signal, the reserve quantity signal, and the humidity signal, which have been input into the fuel cell control section 20, are transferred to the electronic equipment control section 29.

A control program, which can be read by the fuel cell control section 20, is stored in the storage section 24. The fuel cell control section 20 performs the processing in accordance with the control program stored in the storage section 24.

The fuel cell control section 20 is, for example, a microcomputer including a central processing unit (CPU), a random access memory (RAM), and the like. The fuel cell control section 20 controls the fuel cell type power generation section 7 to control the electric power generated by the fuel cell type power generation section 7, and the situation of the power generation of the fuel cell type power generation section 7 is fed back to the fuel cell control section 20. The fuel cell control section 20 transfers the power generation situation, the residual quantity signal, the reserve quantity signal, the humidity signal, and the like, to the electronic equipment control section 29. Moreover, the fuel cell control section 20 performs the opening and closing control of the valves 2-4 on the basis of the humidity signal input from the humidity sensor 28.

The key input section 31 is composed of, for example, various buttons, switches, and the like, and outputs the input signals according to the operations of those buttons and switches to the electronic equipment control section 29.

The electronic equipment control section 29 is, for example, a microcomputer including a CPU, a RAM, a read only memory (ROM), and the like. The electronic equipment control section 29 performs predetermined processing on the basis of an input signal input from the key input section 31, a power generation situation, a residual quantity signal, a reserve quantity signal, a humidity signal, all of which have been input from the fuel cell control section 20. Moreover, the electronic equipment control section 29 outputs a display control signal to the display section 30, and the display according to the display control signal is thereby performed on the display section 30. As the display section 30, for example, a liquid crystal display, an electroluminescent display, or the like, can be used.

Next, the operation of the electronic equipment 1 of the present embodiment is described.

Figure 5:
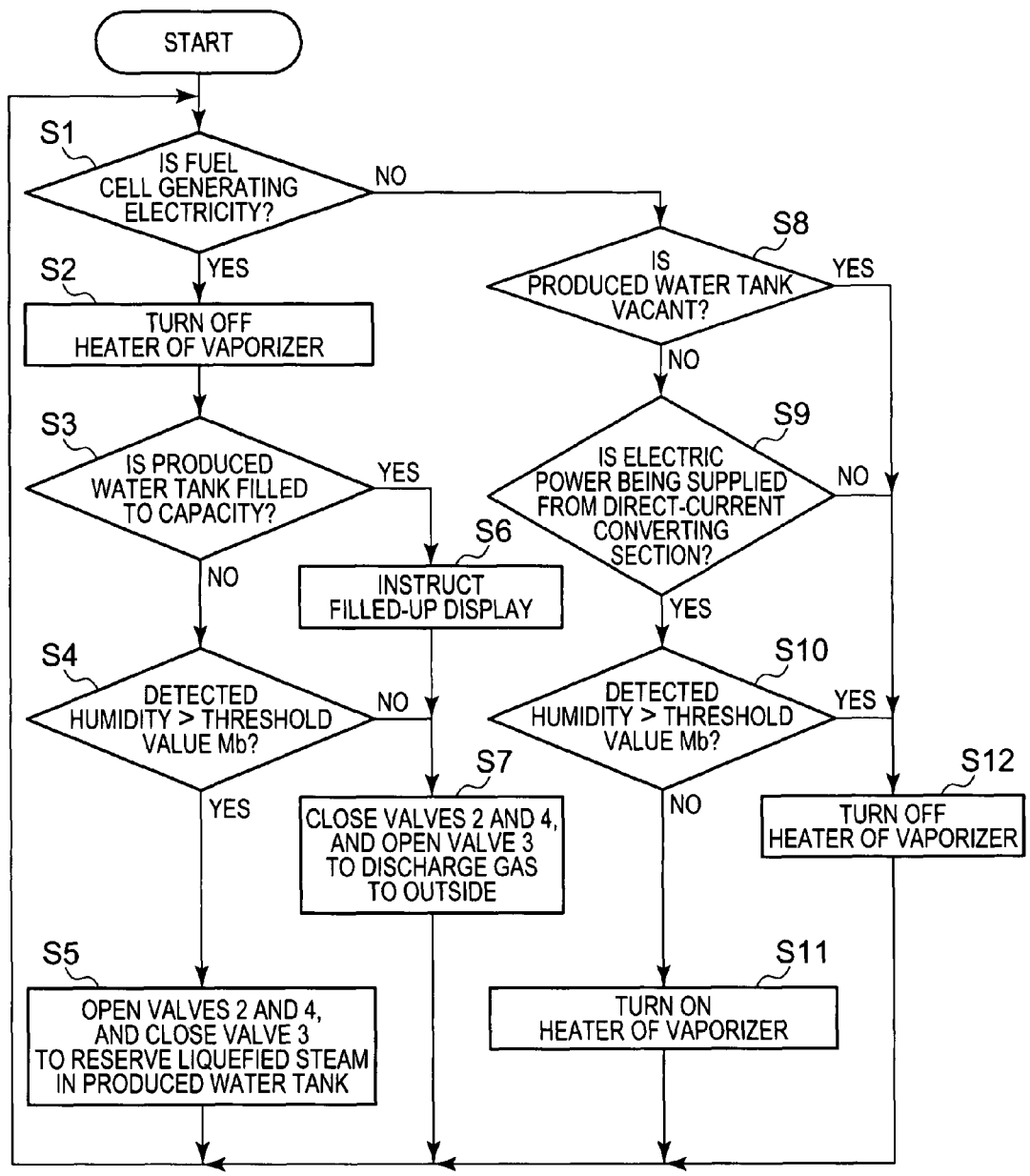
FIG. 5 is a flow chart showing the flow of the processing by a fuel cell control section in the first embodiment.

FIG. 5 is a flow chart showing the flow of the processing by the fuel cell control section 20 in the first embodiment.

The processing is performed by the fuel cell control section 20 in accordance with the control program stored in the storage section 24.

When the fuel cell control section 20 controls the fuel cell type power generation section 7, the fuel cell type power generation section 7 operates, and fuel and water are sent to the fuel cell type power generation section 7.

In the fuel cell type power generation section 7, power generation is performed from the fuel and the water, and gaseous water (steam) is produced. A gas (discharging gas) containing the steam, nitrogen, oxygen, carbon dioxide, and the like is discharged. The produced steam is discharged as gas through the valves 3 and 4, or is reserved in the produced water tank 9 as liquid.

When the fuel cell type power generation section 7 is performing power generation as described above, or even when the fuel cell type power generation section 7 does not perform any power generation, the processing shown in FIG. 5 is performed.

In the present embodiment, as shown in FIG. 5, the fuel cell control section 20 first checks whether the fuel cell control section 20 is driving the fuel cell type power generation section 7 or not (Step S1).

If the power generation is being performed by the fuel cell type power generation section 7 (Step S1: Yes), then the processing of the fuel cell control section 20 shifts to Step S2. If the power generation is not being performed by the fuel cell type power generation section 7 (Step S1: No), then the processing of the fuel cell control section 20 shifts to Step S8.

Next, at Step S2, the fuel cell control section 20 turns off the power supply section 25 to stop the supply of electric power to the heater 16 when the electric power has been being supplied to the heater 16 until then. Because the heater 16 does not produce heat, the water in the produced water tank 9 naturally vaporizes in the vaporizer 11, and the naturally vaporized water is discharged to the outside of the electronic equipment 1.

Successively, the fuel cell control section 20 judges whether the water in the produced water tank 9 is filled to the capacity or not on the basis of the detected value of the reserve quantity by the reserve quantity detection section 26 (Step S3).

If the water in the produced water tank 9 is filled to the capacity (Step S3: Yes), then the processing of the fuel cell control section 20 shifts to Step S6. If the water in the produced water tank 9 is not filled to the capacity (Step S3: No), then the processing of the fuel cell control section 20 shifts to Step S4. Incidentally, the judgment of whether the water in the produced water tank 9 is filled to the capacity or not is performed by, for example, comparing the detected value of the reserve quantity in the produced water tank 9 by the reserve quantity detection section 26 with the capacity of the produced water tank 9. If the detected value of the reserve quantity by the reserve quantity detection section 26 reaches the capacity of the produced water tank 9, then it is judged that the water in the produced water tank 9 is filled to the capacity. If the detected value of the reserve quantity by the reserve quantity detection section 26 is less than the capacity of the produced water tank 9, then it is judged that the water in the produced water tank 9 is not filled to the capacity.

Next, at Step S4, the fuel cell control section 20 judges whether a detected value of humidity by the humidity sensor 28 exceeds a predetermined threshold value Mb or not. If the detected value of the humidity by the humidity sensor 28 exceeds the threshold value Mb (Step S4: Yes), then the processing of the fuel cell control section 20 shifts to Step S5. If the detected value of the humidity by the humidity sensor 28 is equal to the threshold value Mb or less (Step S4: No), then the processing of the fuel cell control section 20 shifts to Step S7.

At Step S5, the fuel cell control section 20 opens the first valve 2 and the third valve 4, and closes the second valve 3. Consequently, the steam produced by the fuel cell type power generation section 7 is liquefied by the withdrawing section 8, and is reserved in the produced water tank 9. The gas other than the water liquefied by the withdrawing section 8 is discharged from the withdrawing section 8 to the outside of the electronic equipment 1 through the valve 4. After the processing at Step S5, the processing of the fuel cell control section 20 returns to Step S1.

At Step S7, the fuel cell control section 20 closes the first valve 2 and the third valve 4, and opens the second valve 3. Consequently, the steam produced by the fuel cell type power generation section 7 is discharged to the outside of the electronic equipment 1 in a gas state, and no water is reserved in the produced water tank 9. After the processing at Step S7, the processing of the fuel cell control section 20 returns to Step S1.

Next, at Step S3, if the water in the produced water tank 9 is filled to the capacity (Step S3: Yes), then the fuel cell control section 20 transfers a filled-up signal (a signal indicating that the water in the produced water tank 9 is filled to the capacity) to the electronic equipment control section 29 (Step S6), and the electronic equipment control section 29 outputs a display control signal to the display section 30 to make the display section 30 display that the water is filled to the capacity. After the fuel cell control section 20 performs the same processing as that at Step S7, the processing of the fuel cell control section 20 returns to Step S1.

On the other hand, if the fuel cell type power generation section 7 is not being performing power generation (Step S1: No), the fuel cell control section 20 judges whether the produced water tank 9 is vacant or not on the basis of the detected value of the reserve quantity by the reserve quantity detection section 26 (Step S8). As a result, if the produced water tank 9 is vacant (Step S8: Yes), then the processing of the fuel cell control section 20 shifts to Step S12. If the inside of the produced water tank 9 is not vacant (Step S8: No), then the processing of the fuel cell control section 20 shifts to Step S9.

At Step S9, the fuel cell control section 20 judges whether electric power is being supplied by the direct-current converting section 23 or not on the basis of a signal input from the power source switching control section 22. As a result, if no electric power is being supplied by the direct-current converting section 23 (Step S9: No), then the processing of the fuel cell control section 20 shifts to Step S12. If electric power is being supplied by the direct-current converting section 23 (Step S9: Yes), then the processing of the fuel cell control section 20 shifts to Step S10.

At Step S10, the fuel cell control section 20 judges whether the detected value of humidity by the humidity sensor 28 exceeds the predetermined threshold value Mb or not. As a result, if the detected value of the humidity by the humidity sensor 28 exceeds the threshold value Mb (Step S10: Yes), then the processing of the fuel cell control section 20 shifts to Step S12. If the detected value of the humidity by the humidity sensor 28 is equal to the threshold value Mb or less (Step S10: No), then the processing of the fuel cell control section 20 shifts to Step S11.

At Step S11, the fuel cell control section 20 turns on the power supply section 25 to supply electric power to the heater 16. Consequently, the water in the produced water tank 9 transpires by the vaporizer 11, and the gaseous water is discharged to the outside of the electronic equipment 1. After the processing at Step S11, the processing of the fuel cell control section 20 returns to Step S1.

At Step S12, if electric power has been being supplied to the heater 16 until then, then the fuel cell control section 20 turns off the power supply section 25 to stop the supply of the electric power of the heater 16. Consequently, the water in the produced water tank 9 naturally vaporizes in the vaporizer 11, and the naturally vaporized water is discharged to the outside of the electronic equipment 1. After the processing at Step S12, the processing of the fuel cell control section 20 returns to Step S1.

According to the present embodiment, if the ambient humidity of the electronic equipment 1 is high during power generation (Step S1: Yes) to exceed the threshold value Mb (Step S4: Yes), then the water produced in the fuel cell type power generation section 7 is reserved in the produced water tank 9. Consequently, it is possible to prevent the electronic equipment 1 and the things around the electronic equipment 1 from being moistened by the condensing of vaporized water.

On the other hand, because the time when the steam produced by the fuel cell type power generation section 7 is directly discharged to the outside through the valve 3 during power generation is the time when the ambient humidity of the electronic equipment 1 is low to be equal to the threshold value Mb or less, the steam is hard to condense on the electronic equipment 1 and the things around the electronic equipment 1. Moreover, because the steam produced by the fuel cell type power generation section 7 during power generation is directly discharged to the outside at this time, the water reserved in the produced water tank 9 is not filled to the capacity.

Moreover, if the water in the produced water tank 9 is filled to the capacity during power generation (Step S3: Yes), then the steam produced in the fuel cell type power generation section 7 is directly discharged to the outside through the valve 3, and consequently it is possible to continue to perform the power generation of the fuel cell type power generation section 7.

Moreover, if the water in the produced water tank 9 is filled to the capacity, the display section 30 displays a fill-up display. Consequently, a user looks at the display, and can cope with the situation by suppressing the discharge of the water produced from the fuel cell type power generation section 7 by throwing away the water in the produced water tank 9, by stopping the electronic equipment 1, or by supplying electric power through the direct-current converting section 23.

Moreover, if electric power is being supplied by the direct-current converting section 23 (Step S9: Yes) and the ambient humidity of the electronic equipment 1 is high to exceed the threshold value Mb (Step S10: Yes) when no power generation is being performed (Step S1: No), then the vaporizer 11 does not operate, and only the water naturally vaporized in the vaporizer 11 is discharged. Consequently, hardly any water is discharged from the electronic equipment 1. Therefore, steam is hard to condense onto the electronic equipment 1 and the things around the electronic equipment 1.

On the other hand, because the state of the vaporizer 11 operating by receiving the supply of electric power from the direct-current converting section 23 when no power generation is performed is the case where the ambient humidity of the electronic equipment 1 is low to be equal to the threshold value Mb or less, steam is hard to condense onto the electronic equipment 1 and the things around the electronic equipment 1. Moreover, because the water reserved in the produced water tank 9 is vaporized by the vaporizer 11 to be discharged, the user is not required to perform the processing of casting away the water in the produced water tank 9. Moreover, because water is vaporized by the vaporizer 11 when the humidity is low, the water can be vaporized fast.

Moreover, because the vaporizer 11 operates when electric power is supplied through the direct-current converting section 23, the lowering of the stored electricity quantity in the secondary battery 21 can be suppressed.

Incidentally, various modifications and the changes of the design may be performed without departing from the scope of the present invention, and, for example, the following embodiments (1)-(18) may be adopted. Moreover, the following embodiments (1)-(18) may be selectively combined together.

(1) The fuel cell control section 20 changes the quantity of the power supply to the heater 16 according to a detected value of humidity by the humidity sensor 28 to change the vaporizing speed by the vaporizer 11 according to the ambient humidity.

(2) If a detected value of the reserve quantity by the reserve quantity detection section 26 is approximate to the capacity of the produced water tank 9 (for example, the case where the detected value exceeds a predetermined threshold value Va (where the threshold value Va is less than the capacity of the produced water tank 9)), then the fuel cell control section 20 makes the power supply section 25 supply to the heater 16 larger electric power than that of the heater 16 in the case where the detected value is not approximate to the capacity (the case where the detected value of the reserve quantity by the reserve quantity detection section 26 is equal to the threshold value Va or less), and the vaporizing speed by the vaporizer 11 is thereby increased.

(3) The vaporization in the ceramic porous material 15 is performed by hitting the ceramic porous material 15 with a forced circulation by a fan in place of the heater 16.

(4) The vaporizer 11 is configured to use a vaporizing dish in place of the ceramic porous material 15. In this case, the water absorbed by the fiber material 14 drips into the vaporizing dish, and the water in the vaporizing dish vaporizes by heating the vaporizing dish with the heater 16, or by hitting a forced circulation to the vaporizing dish.

(5) The guiding section 10 is configured to fill a porous material into the pipe 13 in place of the fiber material 14.

(6) Water is sent to the vaporizer 11 by a pump in place of the guiding section 10.

(7) The water on a halfway stage of the withdrawing section 8 is discharged through a valve, and the quantity of the steam to be discharged to the outside of the electronic equipment 1 is adjusted by the opening and the closing of the valve.

(8) The discharge path through the second valve 3 is not provided, and the steam content in the gas discharged from the valve 4 is adjusted by controlling the degree of the cooling of the steam in discharging gas in the cooling unit of the withdrawing section 8.

(9) The quantity of the steam discharged to the outside of the electronic equipment 1 is adjusted by adjusting the opening quantities of the valves 2-4 by a multistep way or by a stepless way.

(10) The cooling unit in the withdrawing section 8 is configured to be a water-cooling system or an air-cooling system.

(11) The withdrawing section 8 is configured so that water may be absorbed by an absorbent material, such as silica, in place of the cooling unit, and that the absorbed water may be sucked by a pump or the like.

(12) The electronic equipment 1 is configured so that the water discharged from the fuel cell type power generation section 7 may be sent to the other portions in addition to the valves 2 and 3, and that a part of the water discharged from the fuel cell type power generation section 7 may be sent to the valves 2 and 3.

(13) The electronic equipment 1 is provided with a temperature sensor, and is configured so that the fuel cell control section 20 may control the valves 2-4 in accordance with a sensed temperature.

(14) The threshold value Mb is set not to a fixed value, but to a variable. For example, the electronic equipment 1 is configured so that a user can set the threshold value Mb, or that past humidity may be stored so that an average value of the humidity up to predetermined days may be set to the threshold value Mb. Moreover, the threshold value Mb is set according to seasons or areas.

(15) The electronic equipment 1 is configured so that the fuel cell control section 20 forcibly stops the power generation of the fuel cell type power generation section 7 when the detected value of the reserve quantity by the reserve quantity detection section 26 reaches the capacity of the produced water tank 9.

(16) The electronic equipment 1 is configured so that a user can take out water from the produced water tank 9.

(17) When the detected value of the reserve quantity by the reserve quantity detection section 26 has reached the capacity of the produced water tank 9, and when the detected value of humidity by the humidity sensor 28 exceeds a predetermined threshold value Mc, the fuel cell control section 20 instructs the electronic equipment control section 29, and the electronic equipment control section 29 makes the display section 30 display "Although humidity is high, steam is discharged because the produced water tank is filled to the capacity" in obedience to the instruction of the fuel cell control section 20.

(18) The water condensed to liquid from the steam discharged from the fuel cell type power generation section 7 is sent to the produced water tank 9 for preventing the discharge of water in the form of the liquid from the valve 3.

Second Embodiment

Next, a second embodiment of the electronic equipment 1 in the present invention is described.

Figure 6:
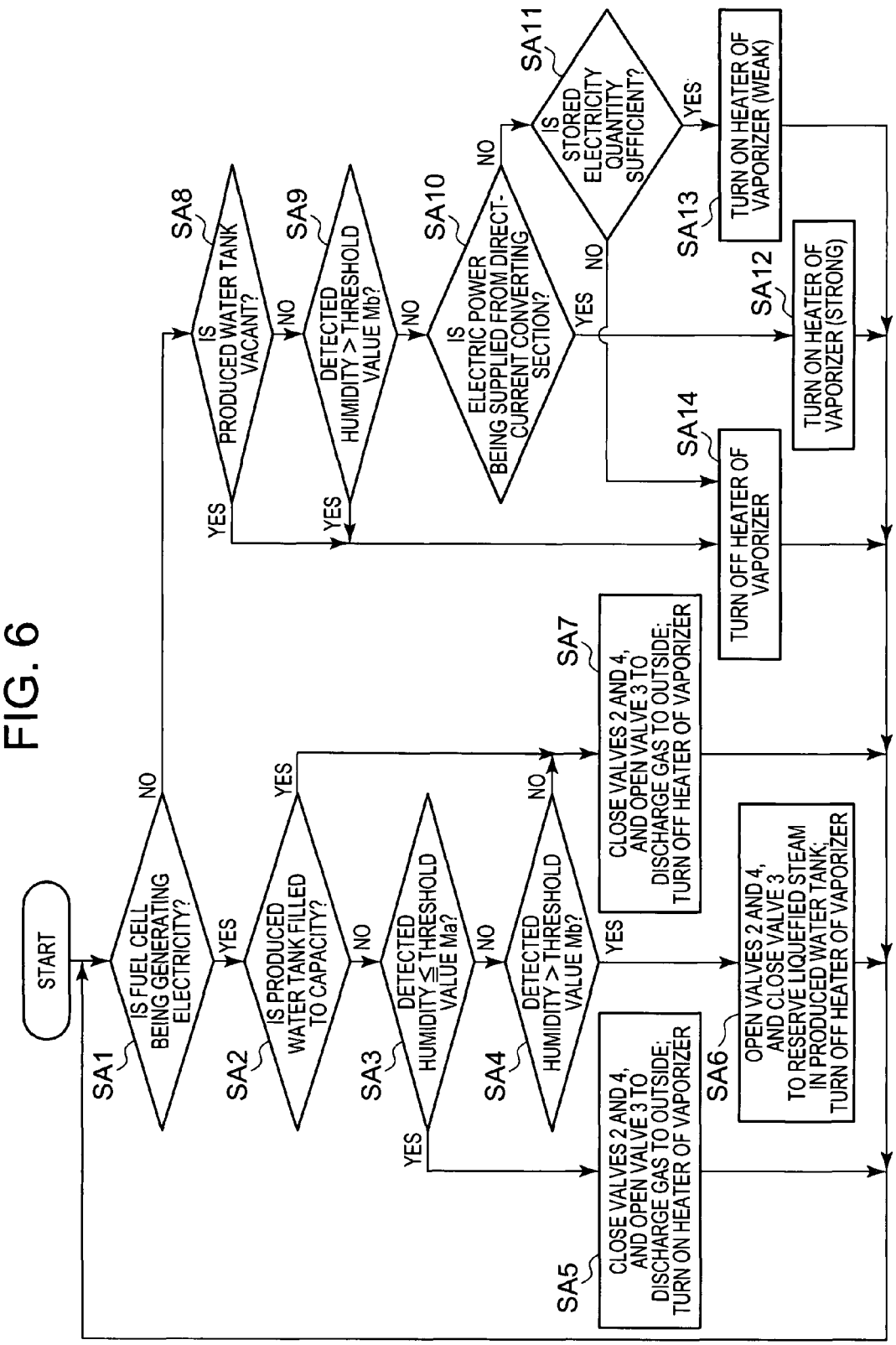
FIG. 6 is a flow chart showing the flow of the processing by the fuel cell control section in a second embodiment.

FIG. 6 is a flow chart showing the flow of the processing by the fuel cell control section of the second embodiment.

The circuit configuration of the electronic equipment 1 of the second embodiment is the same as that of the electronic equipment 1 of the first embodiment. But, the control program stored in the storage section 24 is different from that of the first embodiment, and the flow of the processing of the fuel cell control section 20 in accordance with the control program is also different from that of the first embodiment. In the following, the flow of the processing of the fuel cell control section 20 of the second embodiment is described.

In the present embodiment, as shown in FIG. 6, the fuel cell control section 20 first checks whether the fuel cell control section 20 is driving the fuel cell type power generation section 7 or not (Step SA1). If power generation is being performed by the fuel cell type power generation section 7 (Step SA1: Yes), then the processing of the fuel cell control section 20 shifts to Step SA2. If no power generation is being performed by the fuel cell type power generation section 7 (Step SA1: No), then the processing of the fuel cell control section 20 shifts to Step SA8.

At Step SA2, the fuel cell control section 20 judges whether the water in the produced water tank 9 is filled to the capacity or not on the basis of the detected value of the reserve quantity by the reserve quantity detection section 26. If the water in the produced water tank 9 is filled to the capacity (Step SA2: Yes), then the processing of the fuel cell control section 20 shifts to Step S7. If the water in the produced water tank 9 is not filled to the capacity (Step SA2: No), then the processing of the fuel cell control section 20 shifts to Step SA3.

At Step SA3, the fuel cell control section 20 compares the detected value of humidity by the humidity sensor 28 with a predetermined threshold value Ma, and successively, at Step SA4, the fuel cell control section 20 compares the detected value of humidity by the humidity sensor 28 with the predetermined threshold value Mb (where the threshold value Ma<the threshold value Mb). Incidentally, the threshold value Mb is a first threshold value, and the threshold value Ma is a second threshold value.

If the detected value of the humidity by the humidity sensor 28 is equal to the threshold value Ma or less as the result of the comparison at Step SA3 (Step SA3: Yes), then the fuel cell control section 20 closes the first valve 2 and the third valve 4, and opens the second valve 3. Furthermore, the fuel cell control section 20 turns on the power supply section 25 to supply electric power to the heater 16 (Step SA5). Consequently, the discharging gas containing the steam, which discharging gas has been produced by the fuel cell type power generation section 7, is discharged to the outside of the electronic equipment 1 in a gaseous state, and the water reserved in the produced water tank 9 transpires by the vaporizer 11. The gaseous water (steam) is discharged to the outside of the electronic equipment 1. Successively, the processing of the fuel cell control section 20 returns to Step SA1.

If the detected value of the humidity by the humidity sensor 28 exceeds the threshold value Ma to be equal to the threshold value Mb or less as a result of the comparison (Step SA3: No; Step SA4: No), then the fuel cell control section 20 closes the first valve 2 and the third valve 4, and opens the second valve 3 (Step SA7). Furthermore, if electric power is being supplied to the heater 16, then the fuel cell control section 20 turns off the power supply section 25 to stop the supply of the electric power of the heater 16 (Step SA7). Consequently, the discharging gas containing the steam, which discharging gas has been produced by the fuel cell type power generation section 7, is discharged to the outside of the electronic equipment 1 in a gaseous state, and the water in the produced water tank 9 naturally vaporizes in the vaporizer 11. The naturally vaporized water is discharged to the outside of the electronic equipment 1. Successively, the processing of the fuel cell control section 20 returns to Step SA1.

If the detected value of the humidity by the humidity sensor 28 exceeds the threshold value Mb as a result of the comparison (Step SA3: No; Step SA4: YES), then the fuel cell control section 20 opens the first valve 2 and the third valve 4, and closes the second valve 3. Furthermore, the fuel cell control section 20 turns off the power supply section 25 to stop the supply of the electric power of the heater 16 (Step SA6). Consequently, the water produced in the fuel cell type power generation section 7 is not discharged to the outside of the electronic equipment 1 in a gaseous state, and the water in the produced water tank 9 naturally vaporizes in the vaporizer 11. The naturally vaporized water is discharged to the outside of the electronic equipment 1. Successively, the processing of the fuel cell control section 20 returns to Step SA1.

On the other hand, if no power generation is performed by the fuel cell type power generation section 7 (Step SA1: No), then the fuel cell control section 20 judges whether the produced water tank 9 is vacant or not on the basis of the detected value of the reserve quantity by the reserve quantity detection section 26 (Step SA8). If the produced water tank 9 is vacant as a result (Step SA8: Yes), then the processing of the fuel cell control section 20 shifts to Step SA14. If the produced water tank 9 is not vacant (Step SA8: No), then the processing of the fuel cell control section 20 shifts to Step SA9.

At Step SA9, the fuel cell control section 20 judges whether the detected value of the humidity by the humidity sensor 28 exceeds the predetermined threshold value Mb or not. If the detected value of the humidity by the humidity sensor 28 exceeds the threshold value Mb as the result (Step SA9: Yes), then the processing of the fuel cell control section 20 shifts to Step SA14. If the detected value of the humidity by the humidity sensor 28 is equal to the threshold value Mb or less (Step SA9: No), then the processing of the fuel cell control section 20 shifts to Step SA10.

At Step SA10, the fuel cell control section 20 judges whether electric power is being supplied or not by the direct-current converting section 23 on the basis of the signal input from the power source switching control section 22. If no electric power is being supplied by the direct-current converting section 23 as the result (Step SA10: No), then the processing of the fuel cell control section 20 shifts to Step SA11. If electric power is being supplied by the direct-current converting section 23 (Step SA10: Yes), then the processing of the fuel cell control section 20 shifts to Step SA12.

At Step SA11, the fuel cell control section 20 judges whether the stored electricity quantity of the secondary battery 21 exceeds a predetermined threshold value or not on the basis of the signal input from the power source switching control section 22. If the stored electricity quantity of the secondary battery 21 is sufficient to exceed the predetermined threshold value as the result (Step SA11: Yes), then the processing of the fuel cell control section 20 shifts to Step SA13. If the stored electricity quantity of the secondary battery 21 is equal to the predetermined threshold value or less to be insufficient (Step SA11: No), then the processing of the fuel cell control section 20 shifts to Step SA14.

At Step SA12, the fuel cell control section 20 turns on the power supply section 25 to supply electric power to the heater 16. Consequently, the water in the produced water tank 9 transpires in the vaporizer 11, and the gaseous water is discharged to the outside of the electronic equipment 1. After the processing at Step SA12, the processing of the fuel cell control section 20 returns to Step SA1.

At Step SA13, the fuel cell control section 20 turns on the power supply section 25 to supply electric power to the heater 16. In addition, the electric power to be supplied to the heater 16 at Step SA13 is made to be lower than that to be supplied to the heater 16 at Step SA12. Consequently, the quantity of the transpiration of the water in the produced water tank 9 becomes less than that in the case of Step SA12, and the gaseous water is discharged to the outside of the electronic equipment 1. After the processing at Step SA13, the processing of the fuel cell control section 20 returns to Step SA1.

At Step SA14, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. After the processing at Step SA14, the processing of the fuel cell control section 20 returns to Step SA1.

According to the present embodiment, if the ambient humidity is low to be equal to the threshold value Ma or less during power generation (Step, SA1: Yes), then the water in the produced water tank 9 is vaporized by the vaporizer 11. Consequently, even during power generation, the water in the produced water tank 9 can be fast reduced.

Moreover, if the ambient humidity is low to be equal to the threshold value Mb or less when no power generation is performed (Step SA1: No), then the water in the produced water tank 9 is vaporized by the vaporizer 11. Consequently, the water in the produced water tank 9 can be fast reduced. In this case, if electric power is being supplied through the direct-current converting section 23 (Step SA10: Yes), then the electric power to be supplied to the heater 16 of the vaporizer 11 is made to be larger. If no electric power is being supplied through the direct-current converting section 23 (Step SA10: No), then the electric power to be supplied to the heater 16 of the vaporizer 11 is made to be smaller. Consequently, the consumption of the stored electricity quantity in the secondary battery 21 can be suppressed.

Third Embodiment

Next, a third embodiment of the electronic equipment 1 in the present invention is described.

Figure 7:
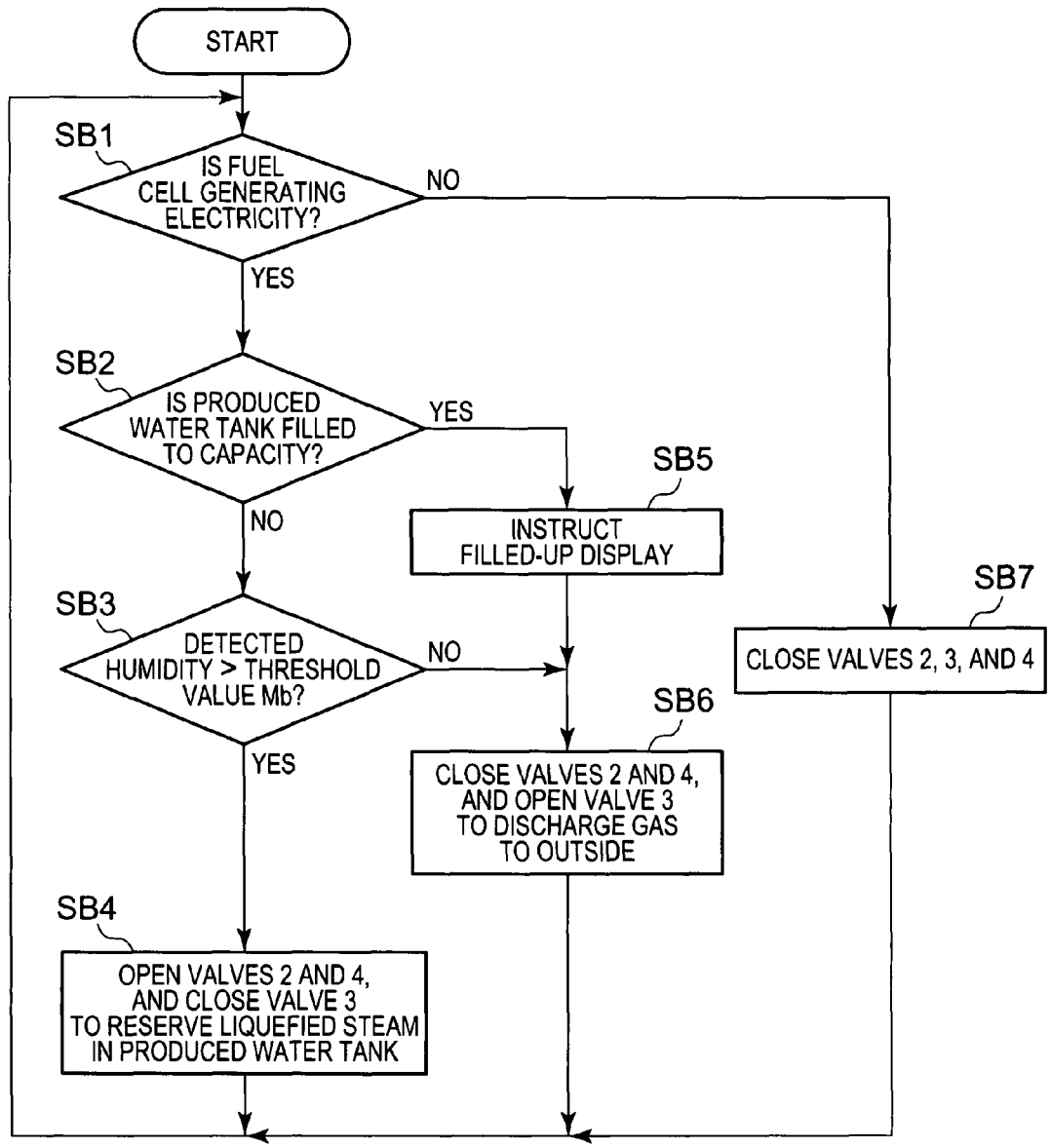
FIG. 7 is a flow chart showing the flow of the processing by the fuel cell control section in a third embodiment.

FIG. 7 is a flow chart showing the flow of the processing by the fuel cell control section of the third embodiment.

The circuit configuration of the electronic equipment 1 of the third embodiment is the same as that of the electronic equipment 1 of the first embodiment. But, the control program stored in the storage section 24 is different from that of the first embodiment, and the flow of the processing of the fuel cell control section 20 is also different from that of the first embodiment in accordance with the control program. In the following, the flow of the processing of the fuel cell control section 20 in the third embodiment is described.

In the present embodiment, as shown in FIG. 7, the fuel cell control section 20 first checks whether the fuel cell control section 20 is driving the fuel cell type power generation section 7 or not (Step SB1). If power generation is being performed by the fuel cell type power generation section 7 (Step SB1: Yes), then the processing of the fuel cell control section 20 shifts to Step SB2. If power generation is not being performed by the fuel cell type power generation section 7 (Step SB1: No), then the processing of the fuel cell control section 20 shifts to Step SB 7.

At Step SB2, the fuel cell control section 20 judges whether the water in the produced water tank 9 is filled to the capacity or not on the basis of the detected value of the reserve quantity by the reserve quantity detection section 26. If the water in the produced water tank 9 is filled to the capacity (Step SB2: Yes), then the processing of the fuel cell control section 20 shifts to Step SB5. If the water in the produced water tank 9 is not filled to the capacity (Step SB2: No), then the processing of the fuel cell control section 20 shifts to Step SB3.

At Step SB3, the fuel cell control section 20 judges whether the detected value of the humidity by the humidity sensor 28 exceeds the predetermined threshold value Mb or not. If the detected value of the humidity by the humidity sensor 28 exceeds the threshold value Mb (Step SB3: Yes), then the processing of the fuel cell control section 20 shifts to Step SB4. If the detected value of the humidity by the humidity sensor 28 is equal to the threshold value Mb or less (Step SB3: No), then the processing of the fuel cell control section 20 shifts to Step SB6.

At Step SB4, the fuel cell control section 20 opens the first valve 2 and the third valve 4, and closes the second valve 3. Consequently, the water produced in the fuel cell type power generation section 7 is liquefied by the withdrawing section 8 to be reserved in the produced water tank 9, and the gas other than the water liquefied in the withdrawing section 8 is discharged from the withdrawing section 8 to the outside of the electronic equipment 1 through the valve 4. After the processing at Step SB4, the processing of the fuel cell control section 20 returns to Step SB1.

At Step SB6, the fuel cell control section 20 closes the first valve 2 and the third valve 4, and opens the second valve 3. Consequently, the water produced in the fuel cell type power generation section 7 is discharged to the outside of the electronic equipment 1 in a gaseous state, and no water is reserved in the produced water tank 9. After the processing at Step SB6, the processing of the fuel cell control section 20 returns to Step SB1.

At Step SB2, if the water in the produced water tank 9 is filled to the capacity (Step SB2: Yes), then the fuel cell control section 20 transfers a filled-up signal (a signal indicating that the water in the produced water tank 9 is filled to the capacity) to the electronic equipment control section 29 (Step SB5), and the electronic equipment control section 29 outputs a display control signal to the display section 30. Thereby, it is displayed on the display section 30 that the water is filled to the capacity. After the fuel cell control section 20 has performed the same processing as that at Step SB6, the processing of the fuel cell control section 20 returns to Step SB1.

On the other hand, if no power generation is being performed by the fuel cell type power generation section 7 (Step SB1: No), then the fuel cell control section 20 closes the first valve 2, the second valve 3, and the third value 4 (Step SB 7). Consequently, the air on the outside of the electronic equipment 1 does not enter the electronic equipment 1 through the first valve 2, the second valve 3, and the third valve 4.

Incidentally, because the turning on and off of the heater 16 by the fuel cell control section 20 is not performed in the present embodiment, the guiding section 10, the vaporizer 11, and the power supply section 25 are not required to be provided in the electronic equipment 1. In this case, the hole 12 of the produced water tank 9 is made to be in a blocked state, or the hole 12 is not formed in the produced water tank 9. Moreover, the electronic equipment 1 may be configured so that a user can throw away the water in the produced water tank 9, or that an absorbent material may be filled in the produced water tank 9 and the produced water tank 9 and the withdrawing section 8 may be integrated into one body.

Moreover, if the vaporizer 11 is not provided in the electronic equipment, then the electric power to be supplied to the heater 16 of the vaporizer 11 is not needed to be used.

According to the present embodiment, if no power generation is being performed (Step SB1: No), then the valves 2-4 are closed. Consequently, steam is hardly discharged from the electronic equipment.

Moreover, if ambient humidity is high to exceed the threshold value Mb, then the water produced in the fuel cell type power generation section 7 is directly discharged to the outside. Consequently, the frequency of filling up the produced water tank 9 to the capacity to cast away the water in the produced water tank 9 becomes small.

Fourth Embodiment

Next, a fourth embodiment of the electronic equipment 1 in the present invention is described.

Figure 8:
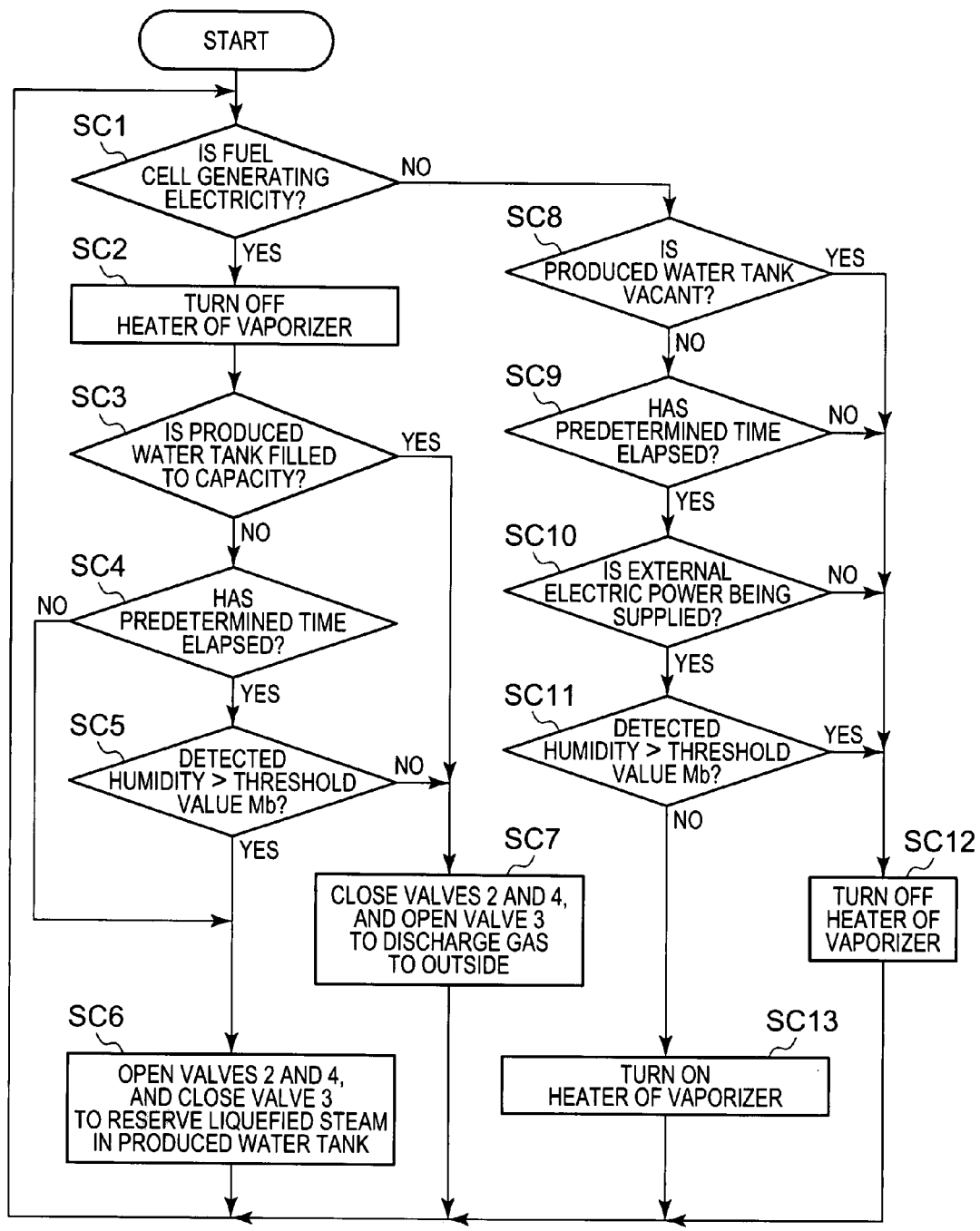
FIG. 8 is a flow chart showing the flow of the processing by the fuel cell control section in a fourth embodiment.

FIG. 8 is a flow chart showing the flow of the processing by the fuel cell control section in the fourth embodiment.

The circuit configuration of the electronic equipment 1 of the fourth embodiment is the same as that of the electronic equipment 1 of the first embodiment. But, the control program stored in the storage section 24 is different from that of the first embodiment, and the flow of the processing of the fuel cell control section 20 in accordance with the control program is also different from that of the first embodiment. In the following, the flow of the processing of the fuel cell control section 20 in the fourth embodiment is described.

In the present embodiment, as shown in FIG. 8, the fuel cell control section 20 first checks whether the fuel cell control section 20 is driving the fuel cell type power generation section 7 or not (Step SC1). If power generation is being performed by the fuel cell type power generation section 7 (Step SC1: Yes), then the processing of the fuel cell control section 20 shifts to Step SC2. If power generation is not being performed by the fuel cell type power generation section 7 (Step SC1: No), then the processing of the fuel cell control section 20 shifts to Step SC8.

At Step SC2, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. Successively, the fuel cell control section 20 judges whether the water in the produced water tank 9 is filled to the capacity or not on the basis of the detected value of the reserve quantity by the reserve quantity detection section 26 (Step SC 3). If the water in the produced water tank 9 is filled to the capacity (Step SC 3: Yes), then the processing of the fuel cell control section 20 shifts to Step SC7. If the water in the produced water tank 9 is not filled to the capacity (Step SC 3: No), then the processing of the fuel cell control section 20 shifts to Step SC4.

At Step SC4, the fuel cell control section 20 judges whether a predetermined time has elapsed or not from the time when the key input section 31 was last operated as the use state of the electronic equipment 1. If the predetermined time has elapsed from the time when the key input section 31 was last operated (Step SC4: Yes), then the processing of the fuel cell control section 20 shifts to Step SC5. If the predetermined time has not elapsed from the time when the key input section 31 was last operated (Step SC4: No), then the processing of the fuel cell control section 20 shifts to Step SC6. Incidentally, because an input signal of the key input section 31 is output to the fuel cell control section 20 through the electronic equipment control section 29, the fuel cell control section 20 counts the elapsed time from the input time of each input of each input signal from the electronic equipment control section 29, and the fuel cell control section 20 thereby judges whether the predetermined time has elapsed or not from the last operation of the key input section 31.

At Step SC5, the fuel cell control section 20 judges whether a detected value of humidity by the humidity sensor 28 exceeds the predetermined threshold value Mb or not. If the detected value of the humidity by the humidity sensor 28 exceeds the threshold value Mb (Step SC5: Yes), then the processing of the fuel cell control section 20 shifts to Step SC6. If the detected value of the humidity by the humidity sensor 28 is equal to the threshold value Mb or less (Step SC5: No), then the processing of the fuel cell control section 20 shifts to Step SC7.

At Step SC6, the fuel cell control section 20 opens the first valve 2 and the third valve 4, and closes the second valve 3. Consequently, the water produced in the fuel cell type power generation section 7 is liquefied by the withdrawing section 8 to be reserved in the produced water tank 9, and the gas other than the water liquefied in the withdrawing section 8 is discharged from the withdrawing section 8 to the outside of the electronic equipment 1 through the valve 4. After the processing at Step SC6, the processing of the fuel cell control section 20 returns to Step SC1.

At Step SC7, the fuel cell control section 20 closes the first valve 2 and the third valve 4, and opens the second valve 3. Consequently, the water produced in the fuel cell type power generation section 7 is discharged to the outside of the electronic equipment 1 in a gaseous state, and no water is reserved in the produced water tank 9. After the processing at Step SC7, the processing of the fuel cell control section 20 returns to Step SC1.

On the other hand, if power generation is not being performed by the fuel cell type power generation section 7 (Step SC1: No), then the fuel cell control section 20 judges whether the produced water tank 9 is vacant or not on the basis of the detected value of the reserve quantity by the reserve quantity detection section 26 (Step SC8). As a result, if the produced water tank 9 is vacant (Step SC8: Yes), then the processing of the fuel cell control section 20 shifts to Step SC12. If the produced water tank 9 is not vacant (Step SC8: No), then the processing of the fuel cell control section 20 shifts to Step SC9.

At Step SC9, the fuel cell control section 20 judges whether the predetermined time has elapsed or not from the last operation of the key input section 31. If the predetermined time has elapsed from the time when the key input section 31 was last operated (Step SC9: Yes), then the processing of the fuel cell control section 20 shifts to Step SC10. If the predetermined time has not elapsed from the time when the key input section 31 was last operated (Step SC9: No), then the processing of the fuel cell control section 20 shifts to Step SC12.

At Step SC10, the fuel cell control section 20 judges whether electric power is being supplied or not by the direct-current converting section 23 on the basis of the signal input from the power source switching control section 22. If no electric power is being supplied by the direct-current converting section 23 as the result (Step SC10: No), then the processing of the fuel cell control section 20 shifts to Step SC12. If electric power is being supplied by the direct-current converting section 23 (Step SC10: Yes), then the processing of the fuel cell control section 20 shifts to Step SC11.

At Step SC11, the fuel cell control section 20 judges whether a detected value of humidity by the humidity sensor 28 exceeds the predetermined threshold value Mb or not. If the detected value of the humidity by the humidity sensor 28 exceeds the threshold value Mb as the result (Step SC11: Yes), then the processing of the fuel cell control section 20 shifts to Step SC12. If the detected value of the humidity by the humidity sensor 28 is equal to the threshold value Mb or less (Step SC11: No), then the processing of the fuel cell control section 20 shifts to Step SC13.

At Step SC12, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. After the processing at Step SC12, the processing of the fuel cell control section 20 returns to Step SC1.

At Step SC13, the fuel cell control section 20 turns on the power supply section 25 to supply electric power to the heater 16. Consequently, the water in the produced water tank 9 transpires by the vaporizer 11, and the gaseous water is discharged to the outside of the electronic equipment 1. After the processing at Step SC13, the processing of the fuel cell control section 20 returns to Step SC1.

Incidentally, although a usage state of the electronic equipment 1 is recognized by the fuel cell control section 20 on the basis of the elapsed time from the last operation of the key input section 31 in the present embodiment, the usage state of the electronic equipment 1 may be recognized by the fuel cell control section 20 by the other means.

For example, the electronic equipment 1 may be configured so that the fuel cell control section 20 may recognize that a user is using the electronic equipment 1 if the display contents on the display section 30 is changing, and that no user is using the electronic equipment 1 if the display contents on the display section 30 is not changing.

Moreover, the electronic equipment 1 may be configured to be provided with a microphone so that the fuel cell control section 20 may recognize that a user is using the electronic equipment 1 if sound input to the microphone is being performed, and that no user is using the electronic equipment 1 if no sound input to the microphone is being performed.

According to the present embodiment, when a user is operating the key input section 31 during power generation (Step SC4: No), the water produced in the fuel cell type power generation section 7 is reserved in the produced water tank 9, and consequently it is possible to prevent a user from feeling moisture. Also if the user is operating the key input section 31 (Step SC9: No) even when the power generation is not being performed, then the vaporizer 11 is not operating, and consequently it is possible to prevent the user from feeling moisture.

Fifth Embodiment

Next, a fifth embodiment of the electronic equipment 1 in the present invention is described.

Figure 9:
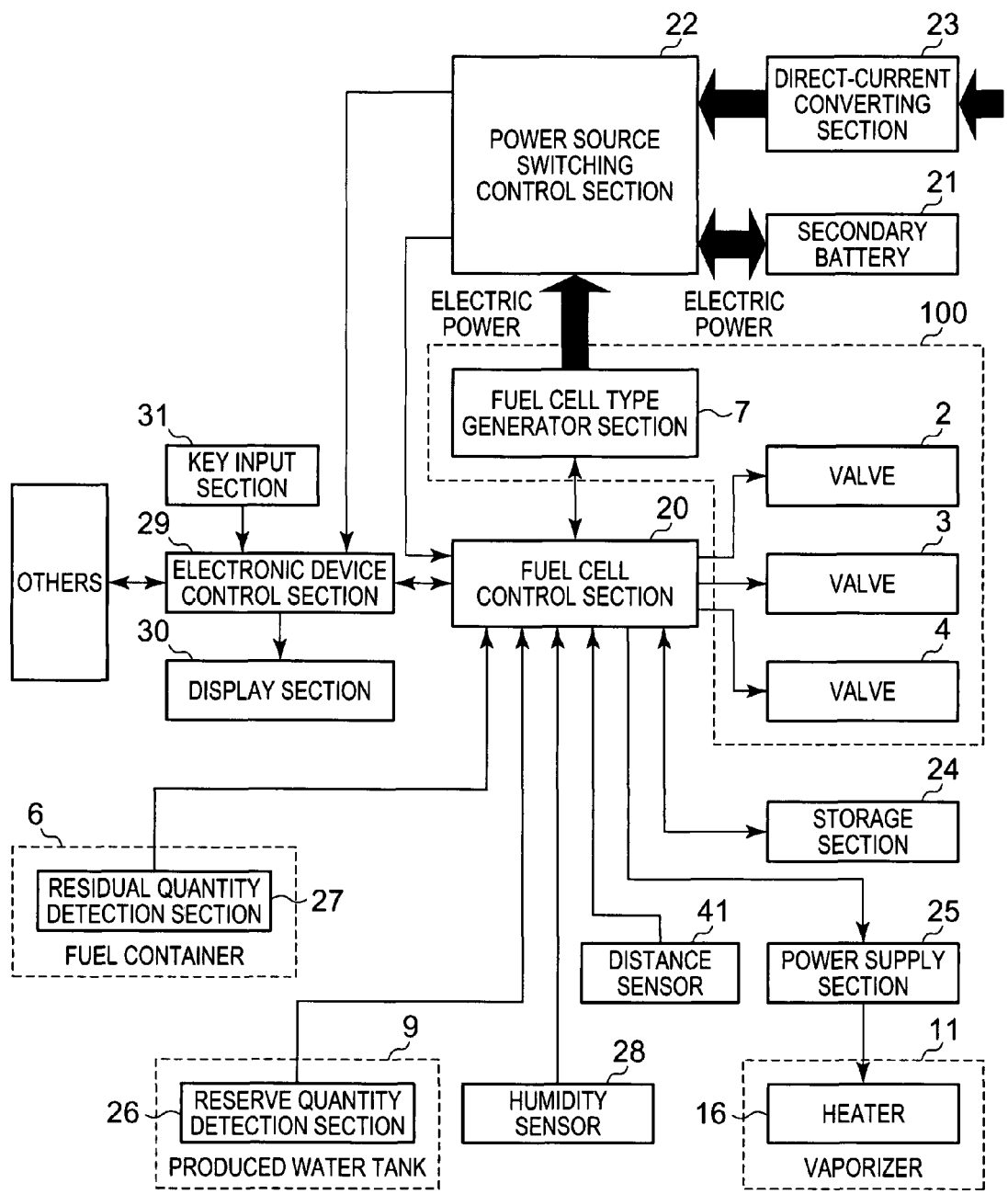
FIG. 9 is a block diagram showing a fifth embodiment of the circuit configuration of the electronic equipment in the present invention.

FIG. 9 is a block diagram showing a fifth embodiment of the circuit configuration of the electronic equipment in the present invention.

As shown in FIG. 9, the electronic equipment 1 of the fifth embodiment is provided with a distance sensor 41 in addition to the components of the electronic equipment 1 of the first embodiment. The distance sensor 41 detects a distance from a discharge opening of water to an obstacle (such as a book, a desk lamp, and the other electronic equipments that are situated near the discharge opening) arranged before the discharge opening as a usage state of the electronic equipment 1, and outputs a signal indicating the detected distance to the fuel cell control section 20. An example of the distance sensor 41 is concretely described with reference to FIG. 10.

Figure 10:
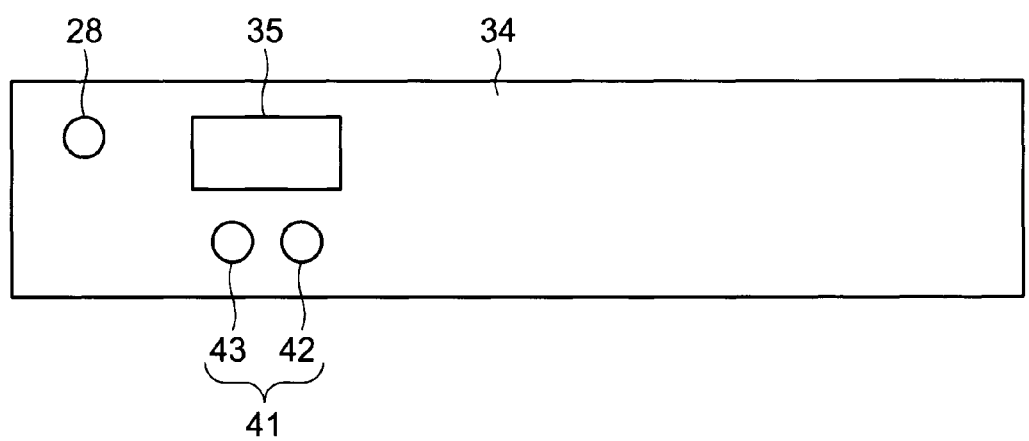
FIG. 10 is a side view of a surface on which a discharge opening in the fifth embodiment of the electronic equipment in the present invention.

FIG. 10 is a side view of the surface on which the discharge opening in the fifth embodiment of the electronic equipment 1 in the present invention is formed.

As shown in FIG. 10, the discharge opening 35 is formed on one side surface 34 of the electronic equipment 1, and, for example, the discharging gas through the second valve 3, the discharging gas through the third valve 4, and the discharging gas through the vaporizer 11 are discharged to the outside through the discharge opening 35.

An ultrasonic wave transmitting section 42 and an ultrasonic wave receiving section 43 of the distance sensor 41 are provided in the neighborhood of the discharge opening 35. The ultrasonic wave transmitting section 42 emits an ultrasonic wave in the direction perpendicular to the side surface 34, and the ultrasonic wave receiving section 43 receives an ultrasonic wave. When an ultrasonic wave is emitted from the ultrasonic wave transmitting section 42, the ultrasonic wave is reflected by an obstacle arranged before the discharge opening 35. The reflected ultrasonic wave is received by the ultrasonic wave receiving section 43. The distance sensor 41 further includes a distance measuring circuit. The distance measuring circuit is a circuit of measuring a time from an emission of the ultrasonic wave by the ultrasonic wave transmitting section 42 to a reception of the ultrasonic wave by the ultrasonic wave receiving section 43, and of calculating the distance from the discharge opening 35 to the obstacle on the basis of the measured time to output a signal indicating the calculated distance to the fuel cell control section 20. Incidentally, the humidity sensor 28 is provided on the side surface 34.

Moreover, the control program stored in the storage section 24 is different from that of the first embodiment, and the flow of the processing of the fuel cell control section 20 in accordance with the control program is also different from that of the first embodiment. In the following, the flow of the processing of the fuel cell control section 20 in the fifth embodiment is described.

Figure 11:
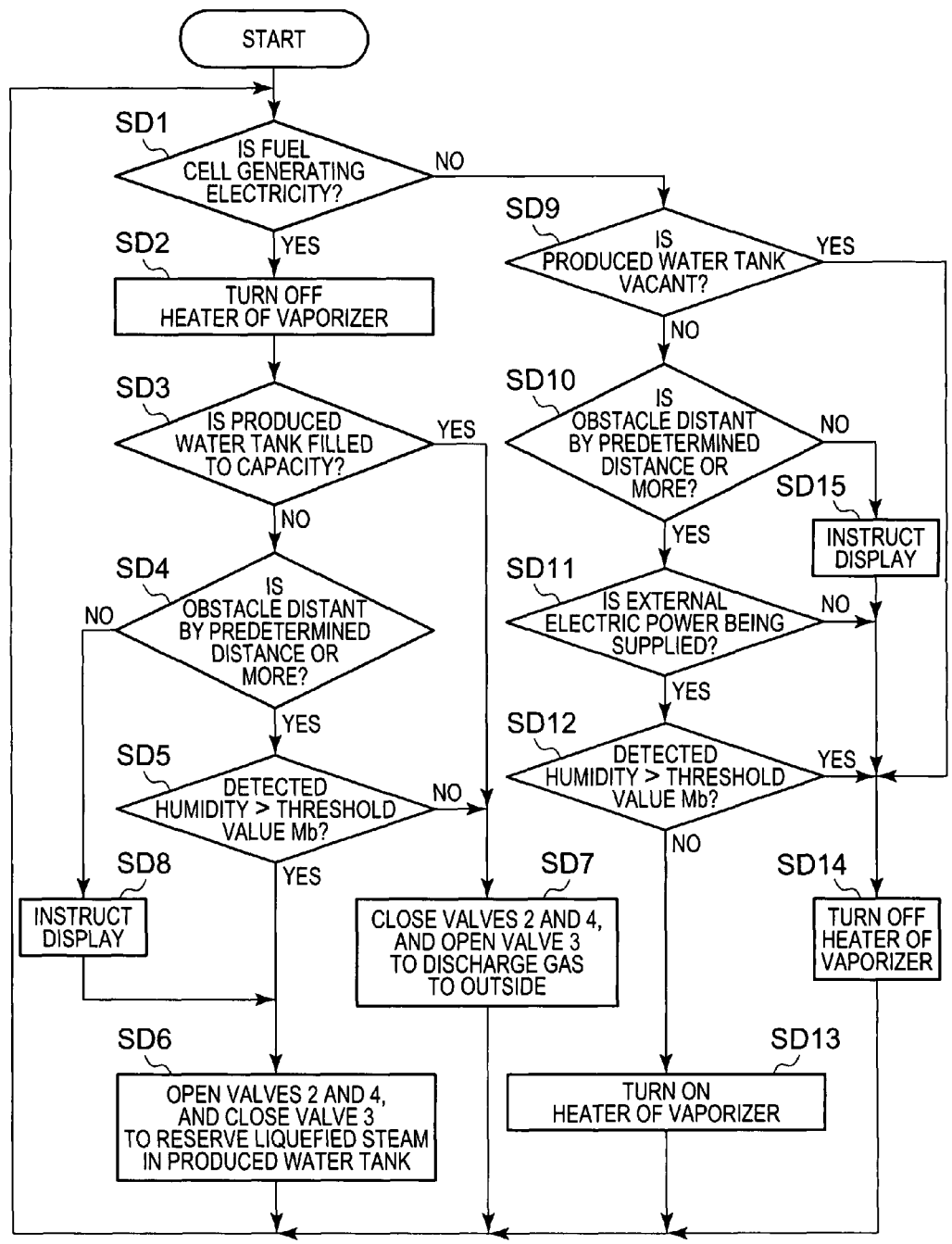
FIG. 11 is a flow chart showing the flow of the processing by the fuel cell control section of the fifth embodiment.

FIG. 11 is a flow chart showing the flow of the processing of the fuel cell control section 20 in the fifth embodiment.

In the present embodiment, as shown in FIG. 11, the fuel cell control section 20 first checks whether the fuel cell control section 20 is driving the fuel cell type power generation section 7 or not (Step SD1). If power generation is being performed by the fuel cell type power generation section 7 (Step SD1: Yes), then the processing of the fuel cell control section 20 shifts to Step SD2. If power generation is not being performed by the fuel cell type power generation section 7 (Step SD1: No), then the processing of the fuel cell control section 20 shifts to Step SD9.

At Step SD2, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. Successively, the fuel cell control section 20 judges whether the water in the produced water tank 9 is filled to the capacity or not on the basis of the detected value of the reserve quantity by the reserve quantity detection section 26 (Step SD 3). If the water in the produced water tank 9 is filled to the capacity (Step SD 3: Yes), then the processing of the fuel cell control section 20 shifts to Step SD 7. If the water in the produced water tank 9 is not filled to the capacity (Step SD 3: No), then the processing of the fuel cell control section 20 shifts to Step SD 4.

At Step SD 4, the fuel cell control section 20 judges whether or not the distance detected by the distance sensor 41 is equal to a predetermined distance or more. If the distance detected by the distance sensor 41 is equal to the predetermined distance or more (Step SD 4: Yes), then the processing of the fuel cell control section 20 shifts to Step SD5. If the distance detected by the distance sensor 41 is less than the predetermined distance (Step SD 4: No), then the processing of the fuel cell control section 20 shifts to Step SD8.

At Step SD5, the fuel cell control section 20 judges whether a detected value of humidity by the humidity sensor 28 exceeds the predetermined threshold value Mb or not. If the detected value of the humidity by the humidity sensor 28 exceeds the threshold value Mb (Step SD5: Yes), then the processing of the fuel cell control section 20 shifts to Step SD6. If the detected value of the humidity by the humidity sensor 28 is equal to the threshold value Mb or less (Step SD5: No), then the processing of the fuel cell control section 20 shifts to Step SD 7.

At Step SD8, the fuel cell control section 20 transfers a close signal (a signal indicating that an obstacle is situated near the discharge opening 35) to the electronic equipment control section 29, and the electronic equipment control section 29 outputs a display control signal to the display section 30. Thereby, the information informing that the obstacle is situated near the discharge opening 35 is displayed on the display section 30. After that, the processing of the fuel cell control section 20 shifts to Step SD6.

At Step SD6, the fuel cell control section 20 opens the first valve 2 and the third valve 4, and closes the second valve 3. Consequently, the water produced by the fuel cell type power generation section 7 is liquefied by the withdrawing section 8 to be reserved in the produced water tank 9, and the gas other than the water liquefied in the withdrawing section 8 is discharged from the withdrawing section 8 to the outside of the electronic equipment 1 through the valve 4. After the processing at Step SD6, the processing of the fuel cell control section 20 returns to Step SD1.

At Step SD 7, the fuel cell control section 20 closes the first valve 2 and the third valve 4, and opens the second valve 3. Consequently, the water produced in the fuel cell type power generation section 7 is discharged to the outside of the electronic equipment 1 in a gaseous state, and no water is reserved in the produced water tank 9. After the processing at Step SD 7, the processing of the fuel cell control section 20 returns to Step SD1.

On the other hand, if power generation is not being performed by the fuel cell type power generation section 7 (Step SD1: No), then fuel cell control section 20 judges whether the produced water tank 9 is vacant or not on the basis of a detected value of a reserve quantity by the reserve quantity detection section 26 (Step SD9). As the result, if the produced water tank 9 is vacant (Step SD9: Yes), then the processing of the fuel cell control section 20 shifts to Step SD14. If the produced water tank 9 is not vacant (Step SD9: No), then the processing of the fuel cell control section 20 shifts to Step SD10.

At Step SD10, the fuel cell control section 20 judges whether or not a distance detected by the distance sensor 41 is equal to the predetermined distance or more. If the distance detected by the distance sensor 41 is equal to the predetermined distance or more (Step SD10: Yes), then the processing of the fuel cell control section 20 shifts to Step SD11. If the distance detected by the distance sensor 41 is less than the predetermined distance (Step SD10: No), then the processing of the fuel cell control section 20 shifts to Step SD15.

At Step SD15, the fuel cell control section 20 transfers a close signal (the signal indicating that an obstacle is situated near the discharge opening 35) to the electronic equipment control section 29, and the electronic equipment control section 29 outputs a display control signal to the display section 30. The information informing that the obstacle is situated near the discharge opening 35 is thereby displayed on the display section 30. After that, the processing of the fuel cell control section 20 shifts to Step SD14.

At Step SD11, the fuel cell control section 20 judges whether electric power is being supplied or not by the direct-current converting section 23 on the basis of a signal input from the power source switching control section 22. If no electric power is being supplied by the direct-current converting section 23 as the result (Step SD11: No), then the processing of the fuel cell control section 20 shifts to Step SD14. If electric power is being supplied by the direct-current converting section 23 (Step SD11: Yes), then the processing of the fuel cell control section 20 shifts to Step SD12.

At Step SD12, the fuel cell control section 20 judges whether a detected value of humidity by the humidity sensor 28 exceeds the predetermined threshold value Mb or not. If the detected value of the humidity by the humidity sensor 28 exceeds the threshold value Mb as the result (Step SD12: Yes), then the processing of the fuel cell control section 20 shifts to Step SD14. If the detected value of the humidity by the humidity sensor 28 is equal to the threshold value Mb or less (Step SD12: No), then the processing of the fuel cell control section 20 shifts to Step SD13.

At Step SD14, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. After the processing at Step SD14, the processing of the fuel cell control section 20 returns to Step SD1.

At Step SD13, the fuel cell control section 20 turns on the power supply section 25 to supply electric power to the heater 16. Consequently, the water in the produced water tank 9 transpires by the vaporizer 11, and the gaseous water is discharged to the outside of the electronic equipment 1. After the processing at Step SD13, the processing of the fuel cell control section 20 returns to Step SD1.

According to the present embodiment, if an obstacle, such as a book, a document, a desk lamp, and a human body, is situated near the discharge opening 35 and the distance to the obstacle is shorter than the predetermined distance, then the water produced by the fuel cell type power generation section 7 is not directly discharged during power generation, and the water in the produced water tank 9 is not vaporized by the vaporizer 11 when no power generation is being performed. Consequently, even if the obstacle like this is arranged near to the discharge opening 35, it is possible not to moisten the obstacle. To put it concretely, it is possible to suppress the discharge of steam from the discharge opening 35 in the following cases: the case where the electronic equipment 1 is located in the neighborhood of a document; the case where the electronic equipment 1 is put in a bag or in a pocket; the case where the electronic equipment 1 is hung from a neck and the discharge opening 35 is covered by the body; the electronic equipment 1 is held in a hand to cover the discharge opening 35 with the hand; and the like.

Moreover, if an obstacle is arranged before the discharge opening 35, then the information informing that the obstacle is closely situated is displayed on the display section 30. Consequently, a user can look at the display contents to change the position of the electronic equipment 1, or to move the obstacle.

Incidentally, although the distance sensor 41 is described above to be composed of an ultrasonic wave type sensor, the distance sensor 41 may be one using, for example, a sensor optically detecting a distance. In this case, the ultrasonic wave transmitting section 42 is made as a light emitting element 42, and the ultrasonic wave receiving section 43 is made as a light receiving element 43.

Sixth Embodiment

Next, a sixth embodiment of the electronic equipment 1 in the present invention is described.

Figure 12:
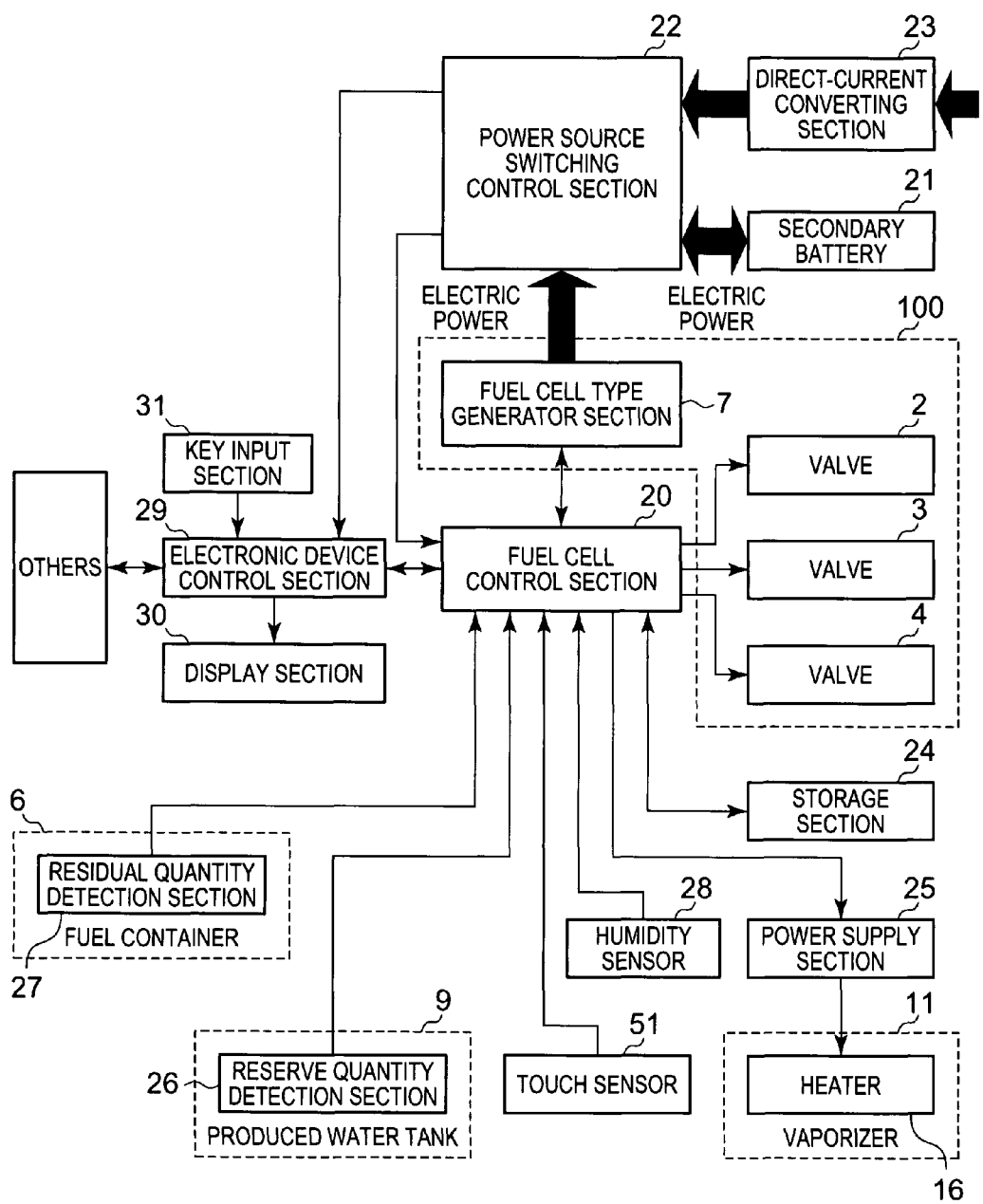
FIG. 12 is a block diagram showing a sixth embodiment of the circuit configuration of the electronic equipment in the present invention.

FIG. 12 is a block diagram showing the sixth embodiment of the circuit configuration of the electronic equipment in the present invention.

Figure 13:
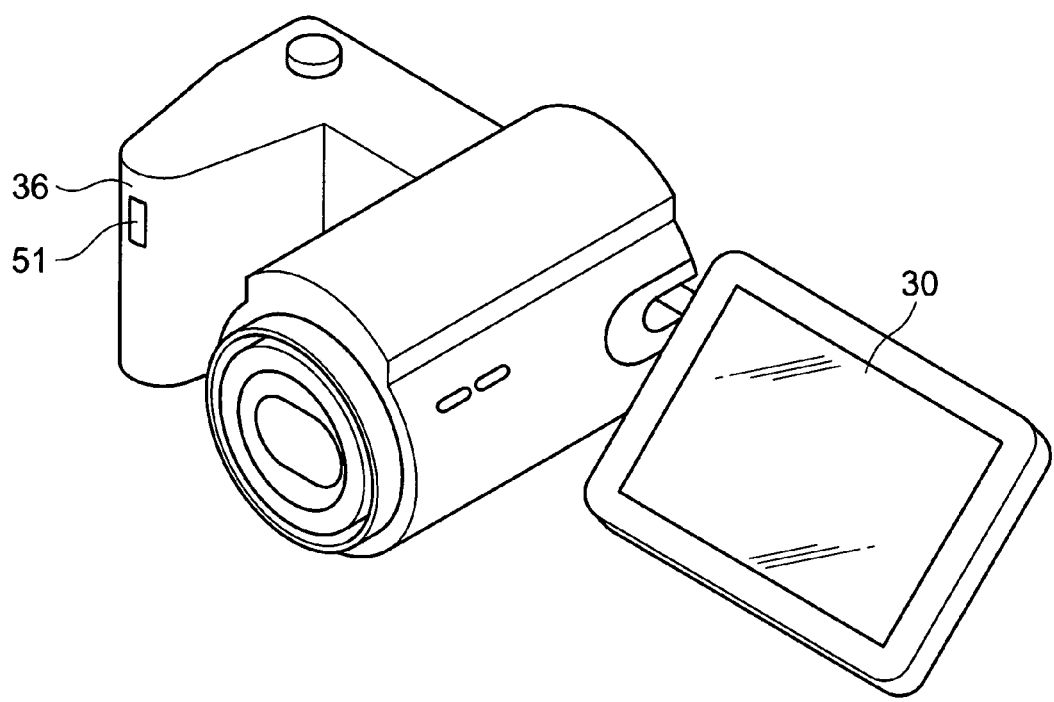
FIG. 13 is a perspective view showing an example of the external appearance of the electronic equipment of the sixth embodiment in the present invention.

FIG. 13 is a perspective view showing an example of the external appearance of the electronic equipment 1 of the sixth embodiment in the present invention.

As shown in FIG. 12, the electronic equipment 1 of the sixth embodiment includes, for example, a capacitance change type touch sensor 51 in addition to the components of the electronic equipment 1 of the first embodiment.

The touch sensor 51 is a touch detection section to detect a touch of a human body to the touch sensor 51 when the human body touches the touch sensor 51 to output a detection signal to the fuel cell control section 20 as a usage state of the electronic equipment 1. As the touch sensor 51, for example, the electrostatic capacity type sensor to detect a change of electrostatic capacity when a human body touches the sensor can be suitably used. In this case, even if things other than the human body touch the touch sensor 51, the electrostatic capacity of the touch sensor 51 does not change. Consequently, the touches of the things are not regarded as touching, and the touch sensor 51 can discriminate the touch of a human body from the touch of each of the things other than a human body.

An embodiment of the touch sensor 51 is furthermore concretely described. Incidentally, FIG. 13 shows a digital camera as an example of the electronic equipment 1 in which the present embodiment is suitably applied.

As shown in FIG. 13, the housing of the electronic equipment 1 is provided with a grip portion 36, and the touch sensor 51 is provided on the surface of the grip portion 36. Consequently, when a user grips the grip portion 36, the hand of the user touches the touch sensor 51, and consequently a detection signal is output from the touch sensor 51 to the fuel cell control section 20.

Next, the flow of the processing by the fuel cell control section 20 in the present embodiment is described.

Figure 14:
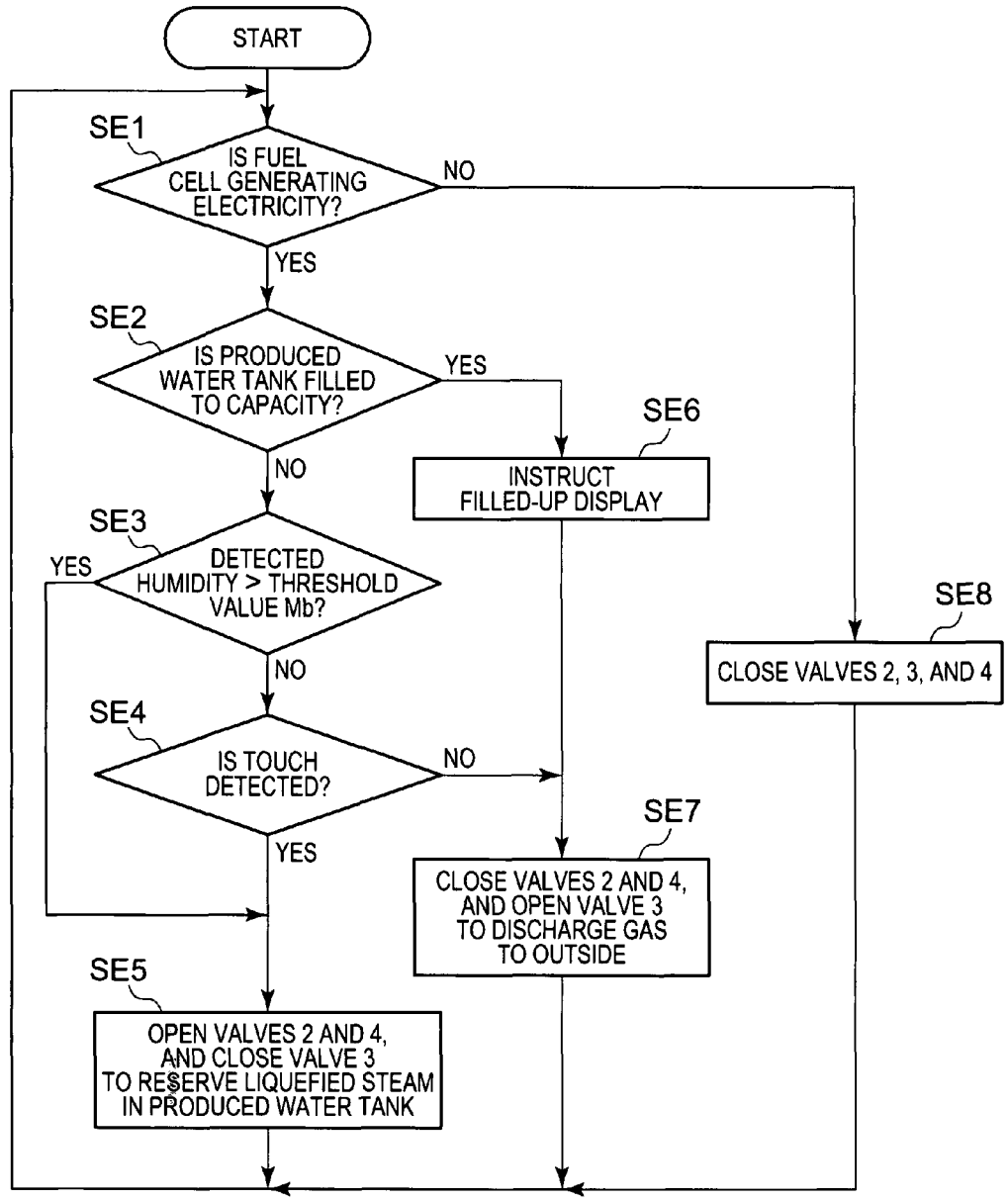
FIG. 14 is a flow chart showing the flow of the processing by the fuel cell control section in the sixth embodiment.

FIG. 14 is a flow chart showing the flow of the processing by the fuel cell control section in the sixth embodiment.

In the present embodiment, as shown in FIG. 14, the fuel cell control section 20 first checks whether the fuel cell control section 20 is driving the fuel cell type power generation section 7 or not (Step SE1). If power generation is being performed by the fuel cell type power generation section 7 (Step SE1: Yes), then the processing of the fuel cell control section 20 shifts to Step SE2. If power generation is not being performed by the fuel cell type power generation section 7 (Step SE1: No), then the processing of the fuel cell control section 20 shifts to Step SE8.

At Step SE2, the fuel cell control section 20 judges whether the water in the produced water tank 9 is filled to the capacity or not on the basis of a detected value of a reserve quantity by the reserve quantity detection section 26. If the water in the produced water tank 9 is filled to the capacity (Step SE2: Yes), then the processing of the fuel cell control section 20 shifts to Step SE6. If the water in the produced water tank 9 is not filled to the capacity (Step SE2: No), then the processing of the fuel cell control section 20 shifts to Step SE 3.

At Step SE 3, the fuel cell control section 20 judges whether a detected value of humidity by the humidity sensor 28 exceeds the predetermined threshold value Mb or not. If the detected value of the humidity by the humidity sensor 28 exceeds the threshold value Mb (Step SE 3: Yes), then the processing of the fuel cell control section 20 shifts to Step SE5. If the detected value of the humidity by the humidity sensor 28 is equal to the threshold value Mb or less (Step SE 3: No), then the processing of the fuel cell control section 20 shifts to Step SE 4.

At Step SE 4, the fuel cell control section 20 judges whether a detection signal has been input from the touch sensor 51 or not. If a detection signal has been input from the touch sensor 51 (Step SE 4: Yes), then the processing of the fuel cell control section 20 shifts to Step SE5. If no detection signal has been input from the touch sensor 51 (Step SE 4: No), then the processing of the fuel cell control section 20 shifts to Step SE7.

At Step SE5, the fuel cell control section 20 opens the first valve 2 and the third valve 4, and closes the second valve 3. Consequently, the water produced in the fuel cell type power generation section 7 is liquefied by the withdrawing section 8 to be reserved in the produced water tank 9, and the gas other than the water liquefied in the withdrawing section 8 is discharged from the withdrawing section 8 to the outside of the electronic equipment 1 through the valve 4. After the processing at Step SE5, the processing of the fuel cell control section 20 returns to Step SE1.

At Step SE7, the fuel cell control section 20 closes the first valve 2 and the third valve 4, and opens the second valve 3. Consequently, the water produced in the fuel cell type power generation section 7 is discharged to the outside of the electronic equipment 1 in a gaseous state, and no water is reserved in the produced water tank 9. After the processing at Step SE7, the processing of the fuel cell control section 20 returns to Step SE1.

At Step SE2, if the water in the produced water tank 9 is filled to the capacity (Step SE2: Yes), then the fuel cell control section 20 transfers a filled-up signal (the signal indicating that the water in the produced water tank 9 is filled to the capacity) to the electronic equipment control section 29 (Step SE6), and the electronic equipment control section 29 outputs a display control signal to the display section 30. Then, the information informing that the water is filled to the capacity is displayed on the display section 30. After the fuel cell control section 20 has performed the same processing as that at Step SE7, the processing of the fuel cell control section 20 returns to Step SE1.

On the other hand, if power generation is not being performed by the fuel cell type power generation section 7 (Step SE1: No), then the fuel cell control section 20 closes the first valve 2, the second valve 3, and the third value 4 (Step SE8). Consequently, the air on the outside of the electronic equipment 1 does not enter the electronic equipment 1 through the first valve 2, the second valve 3, and the third valve 4.

Incidentally, when a detection signal has been input from the touch sensor 51 in the case where no power generation is being performed by the fuel cell type power generation section 7 (Step SE1: No), the fuel cell control section 20 turns off the power supply section 25 to stop the supply of the electric power of the heater 16. When no detection signal has been input from the touch sensor 51, the fuel cell control section 20 turns on the power supply section 25 to supply electric power to the heater 16.

Moreover, the touch sensor 51 may not be the capacitance change type sensor, but may be a sensor detecting a touch by the other methods. Moreover, the touch sensor 51 may be formed on the whole grip portion 36. Moreover, a plurality of touch sensors 51 may be provided to adjust the quantity of the water to be discharged from the electronic equipment 1 according to the number of the touch sensors 51 that the hand of a user touches.

According to the present embodiment, when a user grips the electronic equipment 1 and the hand of the user touches the touch sensor 51, the water produced in the fuel cell type power generation section 7 is not directly discharged during power generation. Consequently, it is possible for a user not to feel any moisture.

Seventh Embodiment

Next, a seventh embodiment of the electronic equipment 1 in the present invention is described.

Figure 15:
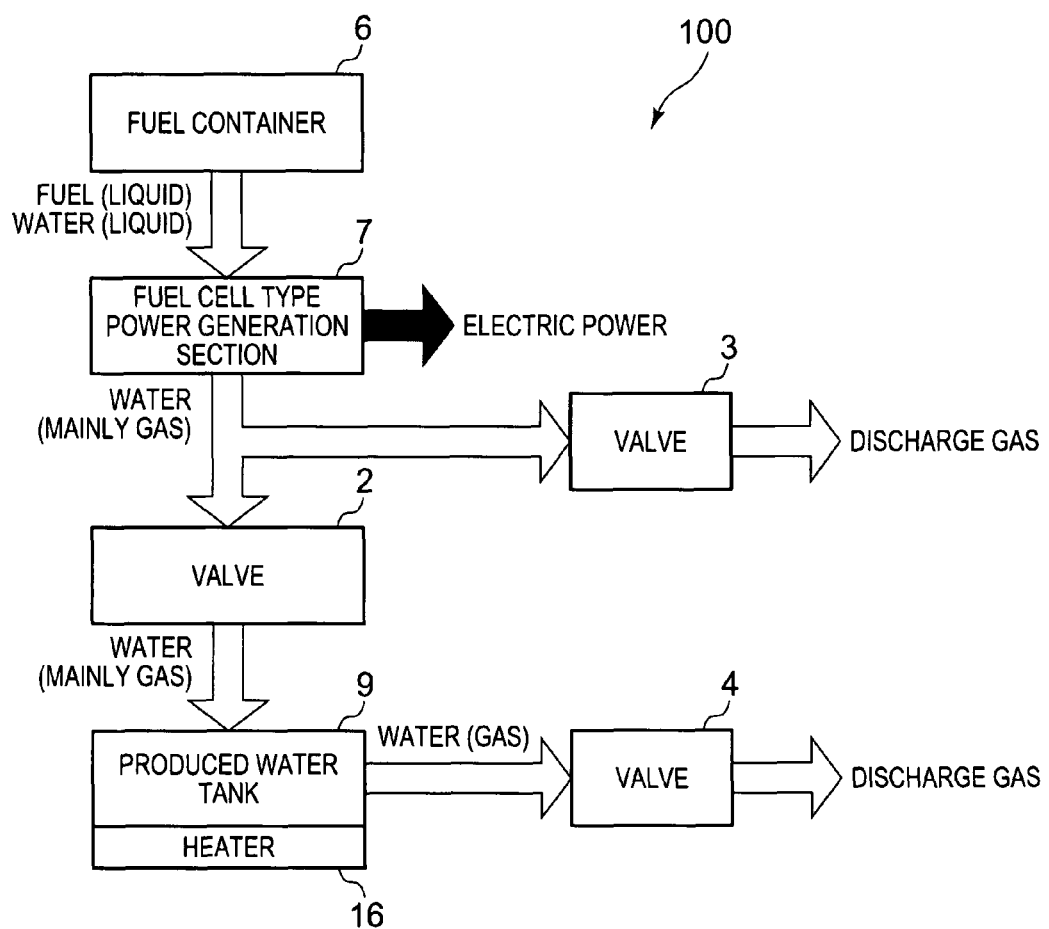
FIG. 15 is a block diagram showing the configuration of a power source section provided in the electronic equipment of a seventh embodiment.

FIG. 15 is a block diagram showing the configuration of a power source section provided in the electronic equipment 1 of the seventh embodiment.

Figure 16:
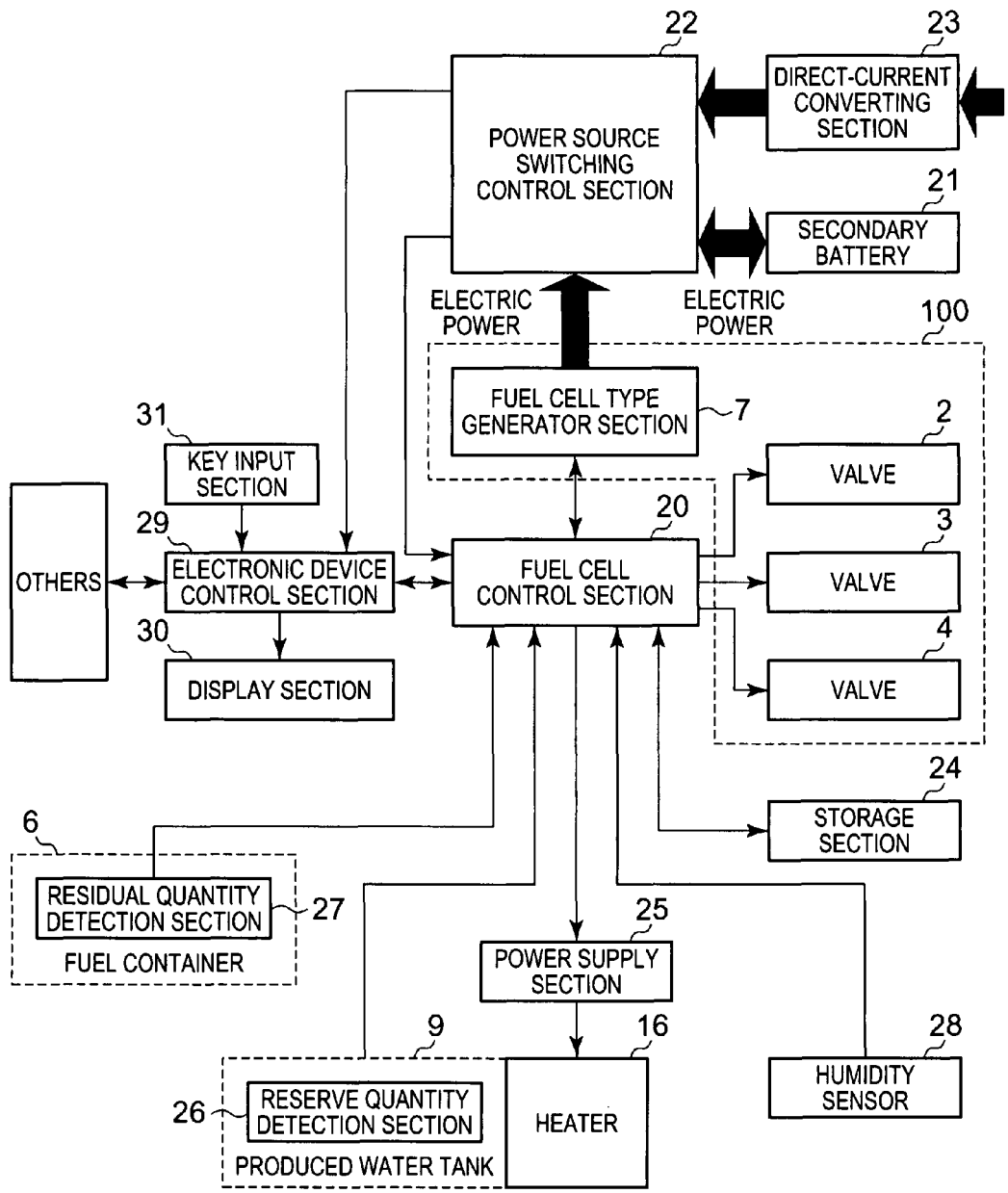
FIG. 16 is a block diagram showing the circuit configuration of the electronic equipment in the seventh embodiment.

FIG. 16 is a block diagram showing the circuit configuration of the electronic equipment in the seventh embodiment.

As shown in FIGS. 15 and 16, the electronic equipment 1 of the seventh embodiment is different from that of the first embodiment in the following respects.

The electronic equipment 1 of the seventh embodiment is not provided with the withdrawing section 8, the guiding section 10, and the vaporizer 11, and the discharging gas containing the gaseous water discharged from the fuel cell type power generation section 7 is sent to the produced water tank 9 through the valve 2. The valve 4 communicates with the hole 12 of the produced water tank 9, and the water in the produced water tank 9 is discharged to the outside of the electronic equipment 1 through the valve 4. An absorbent material is filled in the produced water tank 9, and the water in the discharging gas is absorbed by the absorbent material. Because the heater 16 is provided in the produced water tank 9, the heater 16, the produced water tank 9, and the absorbent material constitute a vaporizer. That is, the produced water tank 9 also works as a part of the vaporizer. Moreover, the reserve quantity detection section 26 measures the electric capacity, the electric resistance, or the mass of the inner part of the produced water tank 9 to detect the moisture quantity in the absorbent material as the reserve quantity of water in the produced water tank 9.

Next, the flow of the processing by the fuel cell control section 20 of the present embodiment is described.

Figure 17:
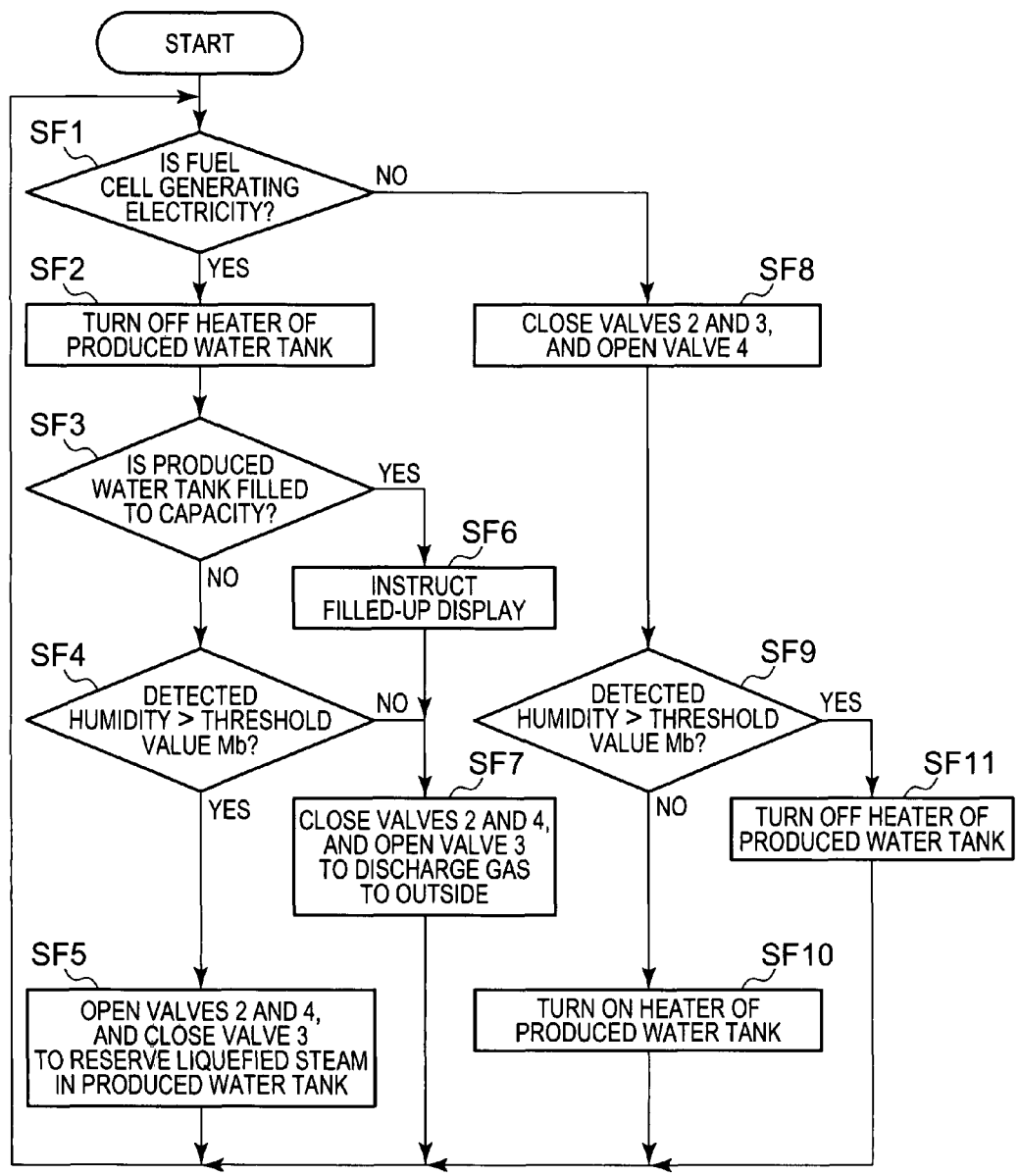
FIG. 17 is a flow chart showing the flow of the processing by a fuel cell control section 20 in the seventh embodiment.

FIG. 17 is a flow chart showing the flow of the processing by the fuel cell control section 20 of the seventh embodiment.

In the present embodiment, as shown in FIG. 17, the fuel cell control section 20 first checks whether the fuel cell control section 20 is driving the fuel cell type power generation section 7 or not (Step SF1). If power generation is being performed by the fuel cell type power generation section 7 (Step SF1: Yes), then the processing of the fuel cell control section 20 shifts to Step SF2. If power generation is not being performed by the fuel cell type power generation section 7 (Step SF1: No), then the processing of the fuel cell control section 20 shifts to Step SF8.

At Step SF2, if electric power is being supplied to the heater 16, then the fuel cell control section 20 turns off the power supply section 25 to stop the supply of electric power of the heater 16. Successively, the fuel cell control section 20 judges whether the water in the produced water tank 9 is filled to the capacity or not on the basis of a detected value of a reserve quantity by the reserve quantity detection section 26 (Step SF3). If the water in the produced water tank 9 is filled to the capacity (Step SF3: Yes), then the processing of the fuel cell control section 20 shifts to Step SF6. If the water in the produced water tank 9 is not filled to the capacity (Step SF3: No), then the processing of the fuel cell control section 20 shifts to Step SF4.

At Step SF4, the fuel cell control section 20 judges whether a detected value of humidity by the humidity sensor 28 exceeds the predetermined threshold value Mb or not. If the detected value of the humidity by the humidity sensor 28 exceeds the threshold value Mb (Step SF4: Yes), then the processing of the fuel cell control section 20 shifts to Step SF5. If the detected value of the humidity by the humidity sensor 28 is equal to the threshold value Mb or less (Step SF4: No), then the processing of the fuel cell control section 20 shifts to Step SF7.

At Step SF5, the fuel cell control section 20 opens the first valve 2 and the third valve 4, and closes the second valve 3. Consequently, the water produced in the fuel cell type power generation section 7 is absorbed by the absorbent material in the produced water tank 9, and the gas other than the water absorbed by the absorbent material is discharged from the produced water tank 9 to the outside of the electronic equipment 1 through the valve 4. After the processing at Step SF5, the processing of the fuel cell control section 20 returns to Step SF1.

At Step SF7, the fuel cell control section 20 closes the first valve 2 and the third valve 4, and opens the second valve 3. Consequently, the water produced in the fuel cell type power generation section 7 is discharged in a gaseous state to the outside of the electronic equipment 1 through the second valve 3, and no water is absorbed by the absorbent material in the produced water tank 9. Then, the water vaporized from the absorbent material is not discharged. After the processing at Step SF7, the processing of the fuel cell control section 20 returns to Step SF1.

At Step SF3, if the water in the produced water tank 9 is filled to the capacity (Step SF3: Yes), then the fuel cell control section 20 transfers a filled-up signal (the signal indicating that the water in the produced water tank 9 is filled to the capacity) to the electronic equipment control section 29 (Step SF6), and the electronic equipment control section 29 outputs a display control signal to the display section 30. The information informing that the water is filled to the capacity is thereby displayed on the display section 30. After the fuel cell control section 20 has performed the same processing as that at Step SF7, the processing of the fuel cell control section 20 returns to Step SF1.

On the other hand, if power generation is not being performed by the fuel cell type power generation section 7 (Step SF1: No), then the fuel cell control section 20 closes the first valve 2 and the second valve 3, and opens the third valve 4 (Step SF8). Successively, the fuel cell control section 20 judges whether a detected value of humidity by the humidity sensor 28 exceeds the predetermined threshold value Mb or not (Step SF 9). If the detected value of the humidity by the humidity sensor 28 exceeds the threshold value Mb as the result (Step SF 9: Yes), then the processing of the fuel cell control section 20 shifts to Step SF11. If the detected value of the humidity by the humidity sensor 28 is equal to the threshold value Mb or less (Step SF9: No), then the processing of the fuel cell control section 20 shifts to Step SF10.

At Step SF10, the fuel cell control section 20 turns on the power supply section 25 to supply electric power to the heater 16. Consequently, the water absorbed by the absorbent material in the produced water tank 9 transpires by the heat of the heater 16, and the gaseous water is discharged to the outside of the electronic equipment 1 through the valve 4. After the processing at Step SF10, the processing of the fuel cell control section 20 returns to Step SF1.

At Step SF11, if electric power is being supplied to the heater 16, then the fuel cell control section 20 turns off the power supply section 25 to stop the supply of electric power of the heater 16. Consequently, the water absorbed by the absorbent material in the produced water tank 9 naturally vaporizes, and the gaseous water is discharged to the outside of the electronic equipment 1 through the valve 4. After the processing at Step SF11, the processing of the fuel cell control section 20 returns to Step SF1.

According to the present embodiment, the heater 16, the produced water tank 9, and the absorbent material constitute a vaporizer, and consequently it is unnecessary to provide a different vaporizer, and the structure of the electronic equipment 1 can be simplified.

Incidentally, although the water in the produced water tank 9 is vaporized by the heating of the heater 16 in the present embodiment, the vaporizing may be performed by hitting a forced circulation to a moisture absorbent in the produced water tank 9 by a fan or the like in place of the heater 16.

Moreover, the fuel cell control section 20 may control the heater 16 so as to decrease the electric power of the heater 16 to be supplied as the detected value of the humidity by the humidity sensor 28 becomes smaller.

Eighth Embodiment

Next, an eighth embodiment of the electronic equipment 1 in the present invention is described.

Figure 18:
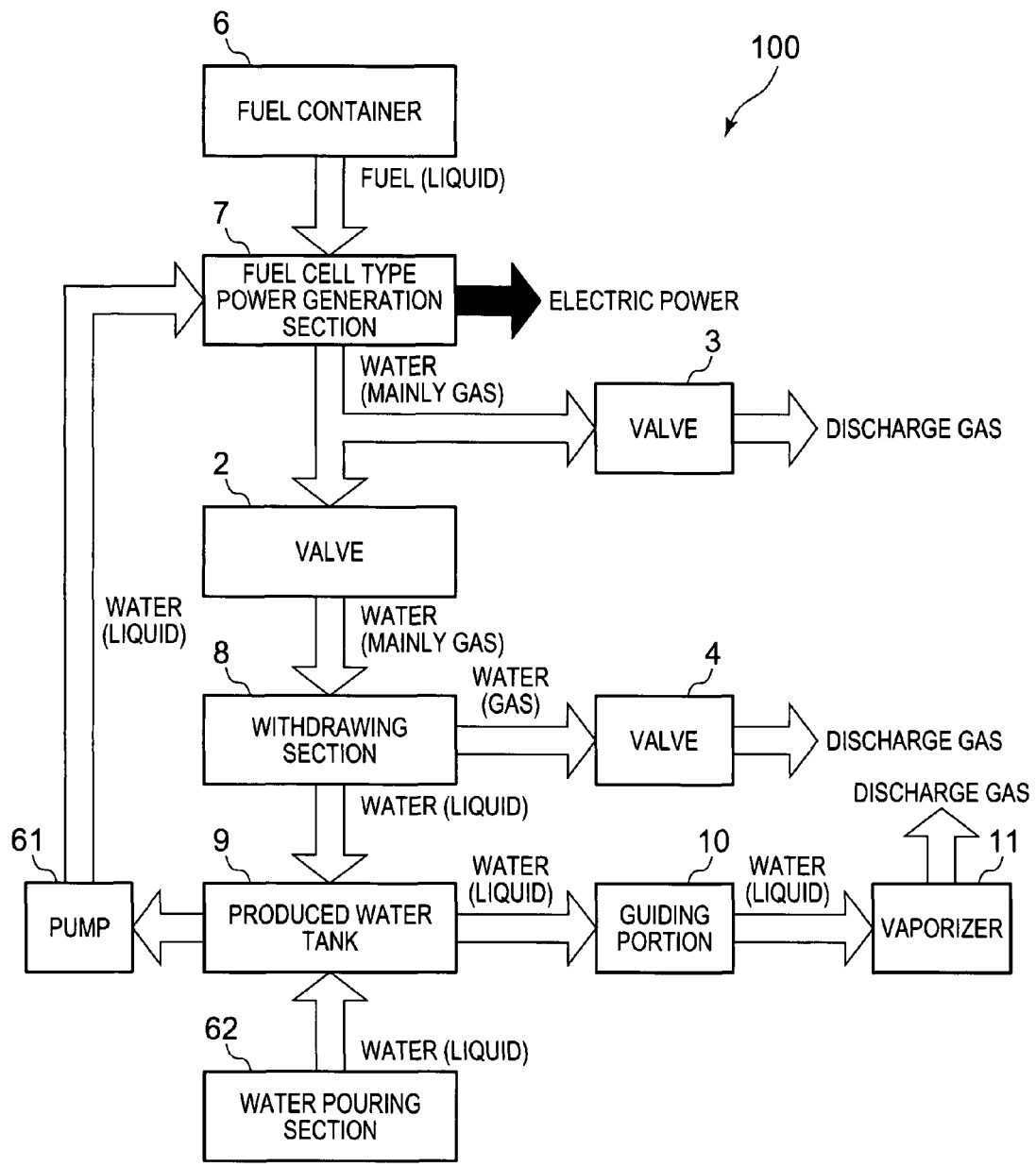
FIG. 18 is a block diagram showing the configuration of a power source section provided in the electronic equipment of an eighth embodiment.

FIG. 18 is a block diagram showing the configuration of the power source section provided in the electronic equipment of the eighth embodiment.

Figure 19:
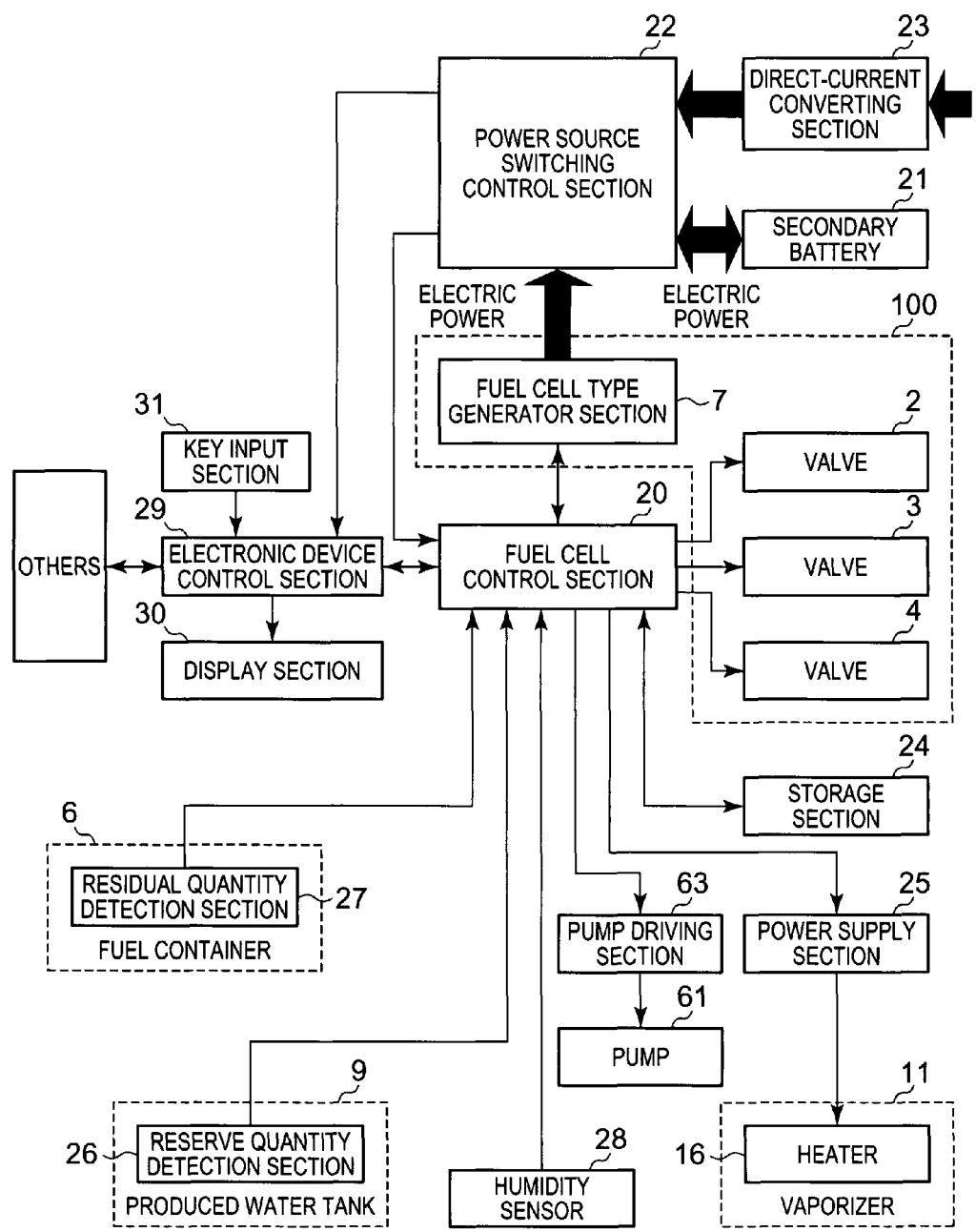
FIG. 19 is a block diagram showing the circuit configuration of the electronic equipment in the eighth embodiment.

FIG. 19 is a block diagram showing the circuit configuration of the electronic equipment in the eighth embodiment.

As shown in FIGS. 18 and 19, the electronic equipment 1 of the eighth embodiment is provided with a pump 61, a water pouring section 62, and a pump driving section 63 in addition to the components of the electronic equipment 1 of the first embodiment. The electronic equipment 1 is configured so that at least a part of water in the produced water tank 9 may be sucked by the pump 61, and that the sucked water may be sent to the vaporizer of the fuel cell type power generation section 7 to be reused for the power generation operation of the fuel cell type power generation section 7.

Moreover, only fuel is reserved in the fuel container 6, and no water is contained. Consequently, the fuel sent from the fuel container 6 and the water sent from the produced water tank 9 are mixed together in the vaporizer of the fuel cell type power generation section 7.

The water pouring section 62 is connected to the produced water tank 9. If a user pours water through the water pouring section 62 when the user needs the water, then the water is reserved in the produced water tank 9.

Next, the flow of the processing by the fuel cell control section 20 in the present embodiment is described.

Figure 20:
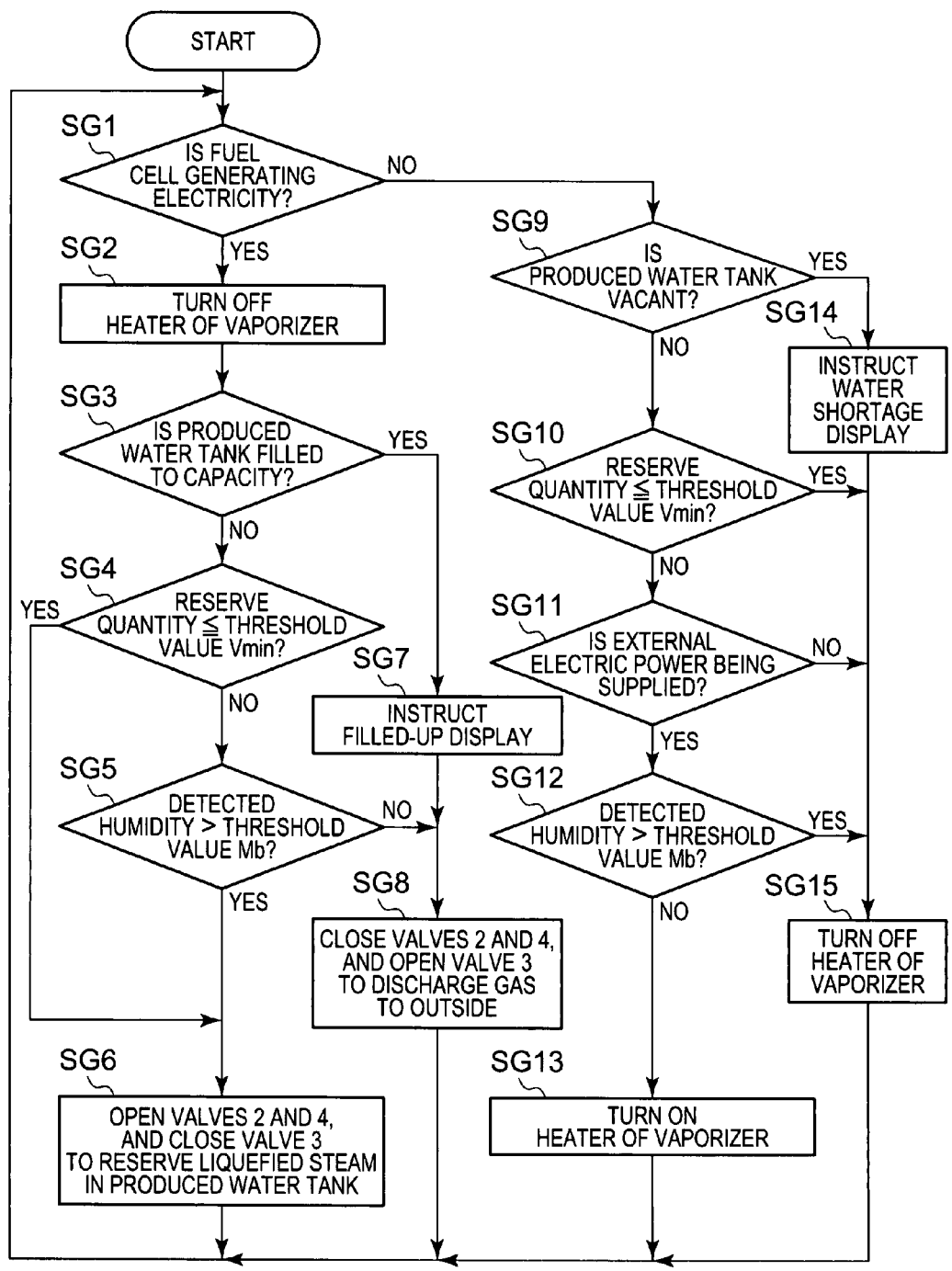
FIG. 20 is a flow chart showing the flow of the processing of the fuel cell control section 20 in the eighth embodiment.

FIG. 20 is a flow chart showing the flow of the processing by the fuel cell control section 20 in the eighth embodiment.

In the present embodiment, as shown in FIG. 20, the fuel cell control section 20 first checks whether the fuel cell control section 20 is driving the fuel cell type power generation section 7 or not (Step SG1). If power generation is being performed by the fuel cell type power generation section 7 (Step SG1: Yes), then the processing of the fuel cell control section 20 shifts to Step SG2. If power generation is not being performed by the fuel cell type power generation section 7 (Step SG1: No), then the processing of the fuel cell control section 20 shifts to Step SG9.

At Step SG2, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. Successively, the fuel cell control section 20 compares a detected value of a reserve quantity by the reserve quantity detection section 26 with a predetermined threshold value Vmax (Step SG3), and compares the detected value of the reserve quantity by the reserve quantity detection section 26 with a predetermined threshold value Vmin (Step SG4). Hereupon, the threshold value Vmax is the capacity of the produced water tank 9, and the threshold value Vmin is the minimum water quantity that must remain in the produced water tank 9. In the present embodiment, because the water in the produced water tank 9 is used for the power generation operation of the fuel cell type power generation section 7, it is necessary that the produced water tank 9 reserves at least a quantity of water that is necessary for a start of the fuel cell type power generation section 7. The threshold value Vmin is set on the basis of the quantity necessary for the power generation operation including the start of the fuel cell type power generation section 7. If the detected value of the reserve quantity by the reserve quantity detection section 26 is equal to the threshold value Vmax or more as the result of the comparison and the water in the produced water tank 9 is filled to the capacity (Step SG3: Yes), then the processing of the fuel cell control section 20 shifts to Step SG7. If the detected value of the reserve quantity by the reserve quantity detection section 26 is less than the threshold value Vmax and exceeds the threshold value Vmin (Step SG4: No), then the processing of the fuel cell control section 20 shifts to Step SG5. If the detected value of the reserve quantity by the reserve quantity detection section 26 is equal to the threshold value Vmin or less (Step SG4: Yes), then the processing of the fuel cell control section 20 shifts to Step SG6.

At Step SG5, the fuel cell control section 20 judges whether a detected value of humidity by the humidity sensor 28 exceeds the predetermined threshold value Mb or not. If the detected value of the humidity by the humidity sensor 28 exceeds the threshold value Mb (Step SG5: Yes), then the processing of the fuel cell control section 20 shifts to Step SG6. If the detected value of the humidity by the humidity sensor 28 is equal to the threshold value Mb or less (Step SG6: No), then the processing of the fuel cell control section 20 shifts to Step SG8.

At Step SG6, the fuel cell control section 20 opens the first valve 2 and the third valve 4, and closes the second valve 3. Consequently, the water produced by the fuel cell type power generation section 7 is liquefied by the withdrawing section 8 to be reserved in the produced water tank 9, and the gas other than the water liquefied in the withdrawing section 8 is discharged from the withdrawing section 8 to the outside of the electronic equipment 1 through the valve 4. After the processing at Step SG6, the processing of the fuel cell control section 20 returns to Step SG1.

At Step SG8, the fuel cell control section 20 closes the first valve 2 and the third valve 4, and opens the second valve 3. Consequently, the water produced in the fuel cell type power generation section 7 is discharged to the outside of the electronic equipment 1 in a gaseous state through the second valve 3, and no water is sent to the produced water tank 9. After the processing at Step SG8, the processing of the fuel cell control section 20 returns to Step SG1.

At Step SG3, if the water in the produced water tank 9 is filled to the capacity (Step SG3: Yes), then the fuel cell control section 20 transfers a filled-up signal (the signal indicating that the water in the produced water tank 9 is filled to the capacity) to the electronic equipment control section 29 (Step SG7), and the electronic equipment control section 29 outputs a display control signal to the display section 30. The information indicating that the water is filled to the capacity is thereby displayed on the display section 30. After the fuel cell control section 20 has performed the same processing as that at Step SG8, the processing of the fuel cell control section 20 returns to Step SG1.

On the other hand, if power generation is not being performed by the fuel cell type power generation section 7 (Step SG1: No), then the fuel cell control section 20 compares a detected value of a reserve quantity by the reserve quantity detection section 26 with a predetermined threshold value V0 (Step SG9), and compares the detected value with the predetermined threshold value Vmin (Step SG10). Hereupon, the threshold value V0 is a value of zero or a value that is unlimitedly approximate to zero, and the threshold value V0 indicates that the produced water tank 9 is vacant. Moreover, the threshold value V0 is smaller than the threshold value Vmin. As a result of the comparison, if the detected value of the reserve quantity by the reserve quantity detection section 26 is equal to the threshold value V0 or less and the produced water tank 9 is vacant (Step SG9: Yes), then the processing of the fuel cell control section 20 shifts to Step SG14. If the detected value of the reserve quantity by the reserve quantity detection section 26 exceeds the threshold value V0 and is equal to the threshold value Vmin or less (Step SG10: Yes), then the processing of the fuel cell control section 20 shifts to Step SG15. If the detected value of the reserve quantity by the reserve quantity detection section 26 exceeds the threshold value Vmin (Step SG10: No), then the processing of the fuel cell control section 20 shifts to Step SG11.

At Step SG11, the fuel cell control section 20 judges whether electric power is being supplied or not by the direct-current converting section 23 on the basis of the signal input from the power source switching control section 22. If no electric power is being supplied by the direct-current converting section 23 as the result (Step SG11: No), then the processing of the fuel cell control section 20 shifts to Step SG15. If electric power is being supplied by the direct-current converting section 23 (Step SG11: Yes), then the processing of the fuel cell control section 20 shifts to Step SG12.

At Step SG12, the fuel cell control section 20 judges whether a detected value of humidity by the humidity sensor 28 exceeds the predetermined threshold value Mb or not. If the detected value of the humidity by the humidity sensor 28 exceeds the threshold value Mb as the result (Step SG12: Yes), then the processing of the fuel cell control section 20 shifts to Step SG15. If the detected value of the humidity by the humidity sensor 28 is equal to the threshold value Mb or less (Step SG12: No), then the processing of the fuel cell control section 20 shifts to Step SG13.

At Step SG13, the fuel cell control section 20 turns on the power supply section 25 to supply electric power to the heater 16. Consequently, the water in the produced water tank 9 transpires by the vaporizer 11, and the gaseous water is discharged to the outside of the electronic equipment 1. After the processing at Step SG13, the processing of the fuel cell control section 20 returns to Step SG1.

At Step SG14, the fuel cell control section 20 transfers a water shortage signal (a signal indicating that the produced water tank 9 is vacant) to the electronic equipment control section 29, and the electronic equipment control section 29 outputs a display control signal to the display section 30. The information informing that the produced water tank 9 is vacant is thereby displayed on the display section 30. After the processing at Step SG14, the processing of the fuel cell control section 20 shifts to Step SG15.

At Step SG15, if electric power is being supplied to the heater 16, then the fuel cell control section 20 turns off the power supply section 25 to stop the supply of electric power of the heater 16. Consequently, the water in the produced water tank 9 naturally vaporizes in the vaporizer 11, and the naturally vaporized water is discharged to the outside of the electronic equipment 1. After the processing at Step SG15, the processing of the fuel cell control section 20 returns to Step SG1.

According to the present embodiment, the water produced by the fuel cell type power generation section 7 can be reused for the power generation of the fuel cell type power generation section 7. Consequently, no water is needed for the fuel container 6.

Moreover, when the reserve quantity of the water in the produced water tank 9 becomes less to be equal to the threshold value Vmin or less even if the ambient humidity is low during power generation, the water produced in the fuel cell type power generation section 7 is reserved in the produced water tank 9. Consequently, it is possible to keep the water in the produced water tank 9 not to be insufficient. Moreover, when the reserve quantity of the water in the produced water tank 9 becomes less to be equal to the threshold value Vmin or less also in the case where no power generation is performed, the vaporizer 11 does not operate. Consequently, it is possible to keep the water in the produced water tank 9 not to be insufficient.

Incidentally, water may be reserved in the fuel container 6 or in a different fuel container, and the water in the fuel container 6 or in the different fuel container may be supplied to the fuel cell type power generation section 7 if the water in the produced water tank 9 is insufficient, or if the fuel cell type power generation section 7 starts power generation.

Moreover, the water necessary at a start of power generation of the fuel cell type power generation section 7 may be transported from the produced water tank 9 to a different tank on occasion, and when the different tank is filled to the capacity, all the water in the produced water tank 9 may be vaporized by the vaporizer 11. In this case, the detection section 26 is configured to detect the reserve quantity of the water in the produced water tank 9 and the reserve quantity of the water in the different tank.

Moreover, although the configuration mentioned above is the one in which the water in the produced water tank 9 is sent to the vaporizer in the fuel cell type power generation section 7 to be used for a power generation operation, the configuration of the present invention is not limited to this configuration, but the water in the produced water tank 9 may be used for the other uses, such as the humidification of the generation cell.

Moreover, the water in the produced water tank 9 may be sent to the fuel cell type power generation section 7 by a pump built in the fuel cell type power generation section 7 in place of the pump 61.

Moreover, the threshold value Vmin may not be a constant, but may be a variable. For example, the threshold value Vmin may be the one that a user can change.

All of the disclosures including the patent specification, the claims, the attached drawings and the abstract of Japanese Patent Application No. 2006-215923 filed Aug. 8, 2006 are herein incorporated by reference.

Although various typical embodiments have been shown and described, the present invention is not limited to those embodiments. Consequently, the scope of the present invention can be limited only by the following claims.

What is claimed is:

1. An electronic equipment comprising:
   a power source section including a fuel cell to output electric power generated by the fuel cell; and
   an electronic equipment main body driven by the electric power output from the power source section,
   wherein the power source section includes:
      a generation section including the fuel cell to perform power generation by the fuel cell and to discharge a discharging gas containing gaseous water produced by the fuel cell;
      a discharging section to discharge to outside a gas containing the gaseous water contained in the discharging gas discharged by the generation section;
      a withdrawing section to withdraw a part of the gaseous water contained in the discharging gas as liquid;
      a reserving section to reserve the water withdrawn by the withdrawing section;
      a reserve quantity detection section to detect a reserve quantity of the water in the reserving section; and
      a control section to control a quantity of the gaseous water in the gas to be discharged from the discharging section to the outside based on at least one of an ambient environmental condition of the electronic equipment and a usage state of the electronic equipment,
   wherein when the reserve quantity detection section detects that the reserve quantity in the reserving section is filled to a capacity, the control section allows the discharging section to discharge the discharging gas and allows the withdrawing section not to withdraw the gaseous water contained in the discharging gas.

2. The electronic equipment according to claim 1, further comprising a humidity detection section to detect humidity in a neighborhood of an external surface of the electronic equipment,
   wherein the control section controls the quantity of the gaseous water contained in the gas to be discharged from the discharging section to the outside according to the humidity detected by the humidity detection section.

3. The electronic equipment according to claim 1, further comprising an input section to output an input signal by being operated,
   wherein the control section controls the quantity of the gaseous water in the gas to be discharged from the discharging section to the outside according to an elapsed time from a last operation of the input section as the usage state of the electronic equipment.

4. The electronic equipment according to claim 1, further comprising:
   a discharge opening for discharging the gas from the discharging section to the outside; and
   a distance detection section to detect a distance from the discharge opening to an obstacle in a neighborhood of the discharge opening as the usage state of the electronic equipment,
   wherein the control section controls the quantity of the gaseous water in the gas to be discharged from the discharging section to the outside according to the distance to the obstacle, the distance being detected by the distance detection section.

5. The electronic equipment according to claim 1, further comprising a touch detection section to detect a touch of a human body to the electronic equipment,
   wherein the control section controls the quantity of the gaseous water in the gas to be discharged from the discharging section to the outside according to a result detected by the touch detection section.

6. The electronic equipment according to claim 1, further comprising a member to supply at least a part of the water in the reserving section to the fuel cell so that the water is used for an operation of the fuel cell,
   wherein the control section allows the discharging section to stop discharging the discharging gas to the outside when the reserve quantity detection section detects that the reserve quantity is less than a predetermined quantity.

7. The electronic equipment according to claim 6, wherein the predetermined quantity is at least a quantity of water necessary for starting-up the fuel cell in the generation section.

8. The electronic equipment according to claim 1, wherein the discharging section includes:
   a first discharging section to discharge the discharging gas to the outside without passing through the withdrawing section; and
   a second discharging section to discharge a remainder of the discharging gas from which the gaseous water is withdrawn as the liquid in the withdrawing section to the outside.

9. The electronic equipment according to claim 8, wherein the control section controls the quantity of the gaseous water contained in the gas to be discharged to the outside at least by controlling the discharge of the discharging gas from the first discharging section to the outside.

10. The electronic equipment according to claim 1, further comprising a vaporizer to vaporize the water in the reserving section to produce steam, and to allow the discharging section to discharge the steam to the outside,
    wherein the discharging section includes the vaporizer and an opening formed in a housing of the electronic equipment, and discharges the steam produced by the vaporizer from the opening to the outside.

11. The electronic equipment according to claim 10, further comprising a humidity detection section to detect humidity in a neighborhood of an external surface of the electronic equipment,
    wherein the control section stops an operation of the vaporizer when the humidity detected by the humidity detection section exceeds a predetermined threshold value.

12. The electronic equipment according to claim 10, further comprising an input section to output an input signal by being operated,
    wherein the control section stops an operation of the vaporizer during a period from a last operation of the input section to an elapse of a predetermined time.

13. The electronic equipment according to claim 10, further comprising:
    a discharge opening for discharging the gas from the discharging section to the outside; and
    a distance detection section to detect a distance from the discharge opening to an obstacle in a neighborhood of the discharge opening, wherein the control section stops an operation of the vaporizer when the distance to the obstacle detected by the distance detection section, is shorter than a predetermined distance.

14. The electronic equipment according to claim 10, further comprising a touch detection section to detect a touch of a human body to the electronic equipment, wherein the control section stops an operation of the vaporizer when the touch detection section detects that the human body touches the electronic equipment.

15. The electronic equipment according to claim 10, wherein the vaporizer includes:
   a porous material that the water in the reserving section permeates; and
   a heating section heating the porous material by receiving supply of electric power,
   wherein the control section controls the electric power to be supplied to the heating section so as to control an operation of the vaporizer.

16. The electronic equipment according to claim 15, further comprising:
   a discharge pipe to enclose the porous material of the vaporizer, the discharge pipe having an end connected to the opening; and
   a guiding section having one end connected to the reserving section and the other end connected to the other end of the discharge pipe, the guiding section having a material selected from the group of a fiber material and the porous material, the material being filled in the guiding section.

17. The electronic equipment according to claim 15, wherein the control section controls the vaporizer to operate using the electric power generated by the fuel cell when the fuel cell in the generation section is generating electric power.

18. The electronic equipment according to claim 15, further comprising a direct-current converting section to convert alternating-current power supplied from the outside into a direct current to supply the direct current to each section of the electronic equipment,
   wherein the control section controls the vaporizer to operate using electric power supplied from the direct-current converting section when the alternating-current power is being supplied from the outside to the direct-current converting section.

19. The electronic equipment according to claim 15, further comprising a power holding section to store and to hold electric power supplied from the outside and the electric power generated by the fuel cell,
   wherein the control section controls the vaporizer to operate using electric power supplied from the power holding section when the stored electricity quantity held by the power holding section is equal to a predetermined threshold value or more.

20. An electronic equipment comprising:
a power source section including a fuel cell to output electric power generated by the fuel cell; and
an electronic equipment main body driven by the electric power output from the power source section,
wherein the power source section includes:
   a generation section including the fuel cell to perform power generation by the fuel cell and to discharge a discharging gas containing gaseous water produced in the fuel cell;
   a discharging section to discharge to outside a gas containing the gaseous water contained in the discharging gas discharged by the generation section;
   a control section to control, a quantity of the gaseous water in the gas discharged from the discharging section to the outside based on at least one of an ambient environmental condition of the electronic equipment and a usage state of the electronic equipment;
   a withdrawing section to withdraw a part of the gaseous water contained in the discharging gas as liquid;
   a reserving section to reserve the water withdrawn by the withdrawing section; and
   a reserve quantity detection section to detect a reserve quantity of the water in the reserving section,
wherein the discharging section includes:
   a first discharging section to discharge the discharging gas to the outside without passing through the withdrawing section; and
   a second discharging section to discharge a remainder of the discharging gas from which the gaseous water is withdrawn as the liquid in the withdrawing section to the outside.

* * * * *